(12) United States Patent
Hesse, II et al.

(10) Patent No.: US 11,949,564 B2
(45) Date of Patent: Apr. 2, 2024

(54) VIRTUAL GAMING ENVIRONMENT

(71) Applicant: Daniel Ryan Hesse, II, Prairie Village, KS (US)

(72) Inventors: Daniel Ryan Hesse, II, Prairie Village, KS (US); Michael Allen Lester, Lee's Summit, MO (US)

(73) Assignee: LAN PARTY TECHNOLOGIES, INC., Prairie Village, KS (US)

( * ) Notice: Subject to any disclaimer, the term of this patent is extended or adjusted under 35 U.S.C. 154(b) by 0 days.

(21) Appl. No.: 17/686,826

(22) Filed: Mar. 4, 2022

(65) Prior Publication Data

US 2023/0283522 A1   Sep. 7, 2023

(51) Int. Cl.
| | |
|---|---|
| *G06F 15/16* | (2006.01) |
| *A63F 13/34* | (2014.01) |
| *G06T 3/40* | (2006.01) |
| *H04L 41/0896* | (2022.01) |
| *H04L 67/104* | (2022.01) |
| *H04L 67/141* | (2022.01) |
| *G06F 3/04842* | (2022.01) |

(52) U.S. Cl.
CPC .......... *H04L 41/0896* (2013.01); *A63F 13/34* (2014.09); *G06T 3/40* (2013.01); *H04L 67/104* (2013.01); *H04L 67/141* (2013.01); *G06F 3/04842* (2013.01)

(58) Field of Classification Search
CPC . H04L 41/0896; H04L 67/104; H04L 67/141; G06F 3/04842; G06T 3/40; A63F 13/34
See application file for complete search history.

(56) References Cited

U.S. PATENT DOCUMENTS

| | | | | |
|---|---|---|---|---|
| 10,636,209 | B1 * | 4/2020 | Thaller | G06T 3/0031 |
| 11,076,128 | B1 * | 7/2021 | Krol | G06T 15/04 |
| 2009/0306998 | A1 * | 12/2009 | Hamilton, II | H04L 67/133 |
| | | | | 715/740 |
| 2010/0082798 | A1 * | 4/2010 | Bhogal | G06Q 10/10 |
| | | | | 709/224 |
| 2011/0078578 | A1 * | 3/2011 | Calis | G06Q 30/02 |
| | | | | 715/740 |

(Continued)

*Primary Examiner* — Oleg Survillo
(74) *Attorney, Agent, or Firm* — Shook, Hardy & Bacon L.L.P.

(57) ABSTRACT

Systems, methods, and media for generating a virtual gaming environment. Specifically, an instance of a virtual gaming environment is generated and hosted on a server. Responsive to communicatively connecting a first and second user computing devices, a virtual gaming environment is populated with at least a first virtual avatar, a virtual desktop, a second virtual avatar, and a second virtual desktop. It is determined that the first virtual avatar is within a first predetermined distance of the second desktop, and based on this, a resolution at which to render a visual representation of activities being executed by a second user computing device associated with the second desktop is determined. A bandwidth at which the visual representation is renderable in real time at the determined resolution is calculated. The visual representation is transmitted, utilizing the calculated bandwidth, to the first user computing device at the determined resolution.

20 Claims, 12 Drawing Sheets

(56) References Cited

U.S. PATENT DOCUMENTS

| | | | |
|---|---|---|---|
| 2014/0040782 A1* | 2/2014 | Hamilton, II | G06F 3/04815 |
| | | | 715/757 |
| 2022/0086203 A1* | 3/2022 | Morris | H04L 65/403 |
| 2023/0147561 A1* | 5/2023 | Murphy-Chutorian | ...... |
| | | | G06F 3/04883 |
| | | | 345/419 |
| 2023/0205737 A1* | 6/2023 | Cundall | G06F 16/176 |
| | | | 715/764 |

* cited by examiner

VIRTUAL GAMING ENVIRONMENT

BACKGROUND

Communication across computing devices has become an integral part of human communication. Advances in this form of communication are constantly being made, allowing for voice calls, video calls, and many different kinds of interactions that may span any distance. As these advances are being made, there are many issues that need to be taken into account such as speed, security, and the limitations of the computing devices being used to facilitate this communication. Computing devices that are directly connected during communications are left vulnerable to potential harmful programs. Additionally, limitations in bandwidth may degrade the communications or cause them to slow greatly if too much information is passed between communicating computing devices.

SUMMARY

Aspects of the present disclosure relate to techniques for generating a virtual gaming environment shared by multiple user computing devices. The virtual gaming environment may be hosted on a server and allows for the facilitation of a connection between multiple computing devices. The connection between the multiple computing devices may be through the server without the need to directly connect each user computing device. Additionally, the virtual gaming environment may facilitate communications between each user computing device and allow for the dynamic adjustment of bandwidths used to facilitate these communications. In some embodiments, the dynamic adjustment of the bandwidth may be based on a distance between a virtual avatar associated with a first user computing device and a virtual desktop associated with a second user computing device.

As a non-limiting and illustrative example, a virtual gaming environment may be generated on a server and a plurality of user computing devices may be connected to the virtual gaming environment hosted on the server. This virtual gaming environment may be populated with any number of virtual avatars and virtual desktops. The virtual desktops may be associated with each of the user computing devices or may be independent of a user computing device. Additionally, a visual representation of activities being executed by a user computing device may be displayed at a virtual display screen of a virtual desktop associated with the user computing device. As described herein, the visual representation may be transmitted at various resolutions, and a bandwidth needed for the visual representation to be rendered at the particular resolution may be determined. Additionally, virtual gaming sub-environments may be generated based on receiving a selection, by a first user, of a virtual desktop not associated with the first user.

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

BRIEF DESCRIPTION OF THE DRAWINGS

Embodiments of the present disclosure are described in detail below with reference to the attached drawing Figures, wherein.

DETAILED DESCRIPTION

Figure 1A:
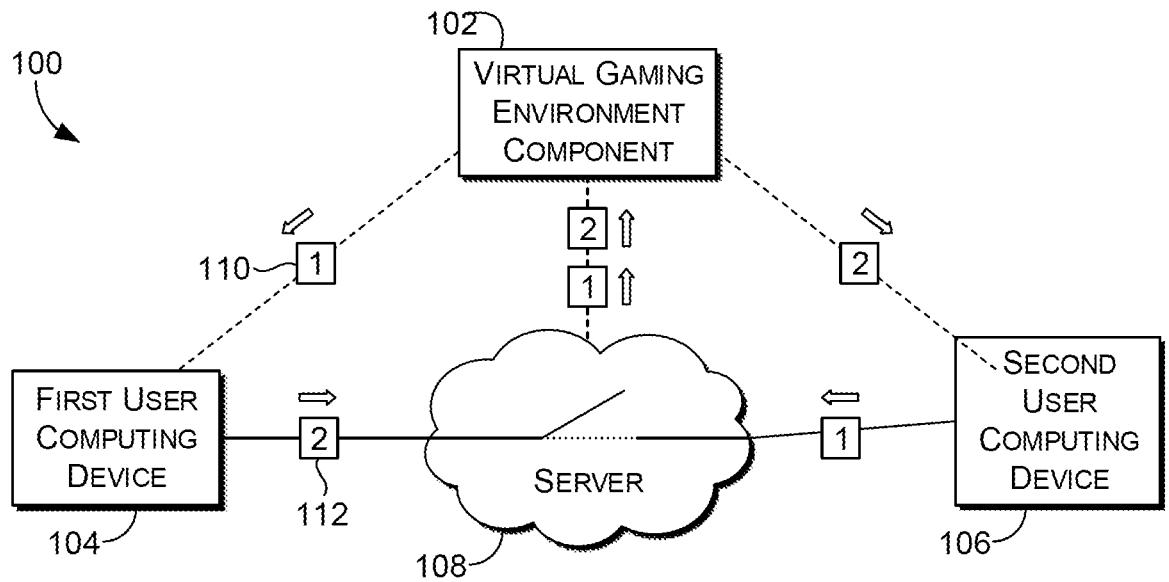
FIGS. 1A and 1B depicts an example operating environment for generating a virtual gaming environment, in accordance with some embodiments of the present disclosure.

Traditionally, virtual gaming environments are based on peer-to-peer connections. In other words, the computing devices sharing the virtual gaming environment are directly connected. This peer-to-peer connection can leave both user devices vulnerable to security issues as each computing device may be providing direct access to each other via the direct connection. Further, these peer-to-peer connections generally have issues managing the transfer of information between the computing devices at appropriate resolutions with a fixed bandwidth. In contrast to traditional approaches, such as those described above, the system and methods described herein may connect a plurality of user computing devices to a server which hosts a virtual gaming environment. This server facilitates transmission of data between the plurality of user computing devices. This may facilitate interaction and communication between the plurality of user computing devices without a direct connection. This may protect the user computing devices from various threats (e.g., code injection, open port exposure, or other exploitable avenues for malicious attack) as it avoids the need to directly connect the plurality of user computing devices. Additionally, some of the embodiments described herein allow for management of bandwidth used to transmit visual representations of activities being performed on the plurality of user computing devices. This allows for the efficient use of communication recourses and provides a more comprehensive transmission of information that is more relevant and less relevant to a user.

In embodiments, the virtual gaming environment may be populated with a plurality of assets. These assets can be visual representations of users or user computing devices, along with any other programmatic or visual information. For example, a first user computing device associated with a first user may be communicatively connected to the server. In response the server may populate a first virtual avatar representative of, and corresponding to, the first user, and a first virtual desktop representative of, and corresponding to, the first user computing device into the virtual gaming environment. Similarly, a second user computing device associated with a second user may be connected to the server. The server may also populate the virtual gaming environment with a second virtual avatar representative of, and associated, with the second user, and a second virtual desktop representative of, and corresponding to, the second user computing device. The avatars are able to be manipulated by their associated user.

For example, a first user may control a first virtual avatar to move throughout and interact with the virtual gaming environment. The perspective of the first user through the first virtual avatar can vary. Namely, the first virtual avatar may be displayed on the first user computing device such that the first user can see the first virtual avatar on their display. This perspective is referred to herein as a third-person perspective. In other embodiments, the first virtual avatar is not displayed on the first users computing device. The perspective displayed on the first user computing device may be through the virtual "eyes" of the avatar, as such, the first user can see a display representative of a field of view of the first virtual avatar. Therefore, the first virtual avatar does not need to be displayed. This perspective is referred herein as a first-person perspective.

Additionally, the first virtual avatar is capable of approaching or moving away from other avatars. The first virtual avatar is also capable of approaching or moving away from virtual desktops, including at least the a first virtual desktop associated with the first user. Through the use of the first virtual avatar, a first user is capable of interacting with other avatars and other virtual desktops. For example a first user may use text, voice, gesture, or any other form of communication in order to communicate with users associated with other avatars. The first user may also interact with their own, or other virtual desktops through the use of the first virtual avatar. In embodiments, the first user may interact with virtual desktops through customization options. For example, the first user can change the visual appearance of the virtual desktop associated with the first user. In further embodiments, the first user can change the visual appearance of other virtual desktops. These changes may be permanent, or temporary. These customizations may be stored in association with the first user such that the customized virtual desktop may be populated into future virtual gaming environments.

In embodiments, visual representations of activities being executed by user computing devices are displayed at the virtual desktop associated with that user. For example, a second user computing device may be executing a program. This program may be a word processing software, a video game, a video or audio streaming program, or any program which may be run on the second user computing device. The second user computing device may transmit a visual representation of this program and the second user's interactions to the server. The server may then transmit this visual representation to the first user's computing device such that the visual representation is displayed at the second virtual desktop within the virtual gaming environments.

As way of an illustrative example, a second user may be playing a video game such as tic tac to on the second user computing device. A visual representation of the video game tic tac to may be transmitted to the server. The server may then transmit the visual representation of the video game tic tac to the first user computing device. In this embodiment, the transmission of the visual representation to the first user computing device causes display of the visual representation on a display of the first user computing device. In embodiments, the visual representation is displayed at a location associated with the second virtual desktop such as a virtual display screen. This method of display causes the second virtual desktop to display the video game tic tac to as if the virtual desktop was the physical display of the second user computing device. In other words, the visual representation may be displayed in real time. In embodiments, the server may adjust the resolution at which the visual representation is displayed. This adjustment of the resolution may be based on the location of an avatar in comparison with the location of the virtual desktop displaying the visual representation. For example, the closer an avatar is to a virtual desktop, the higher the resolution of the visual representation, and the farther away an avatar is to a virtual desktop, the lower the resolution of the visual representation. In further embodiments, if an avatar is a predetermined distance away from a virtual desktop, the server may cause the display of a digital image at the virtual desktop. This image could be representative of the user associated with the virtual desktop, or could be representative of the program being executed on the user computing device associated with the virtual desktop.

A bandwidth at which the visual representation of the activities being executed by the second user computing device is calculated such that the visual representation is renderable in real time at the determined resolution. In embodiments, the calculated bandwidth may be a minimum bandwidth required to transmit the visual representation of the activities in real time. Calculating a bandwidth at which to display the visual representation provides for multiple improvements over previous technologies. At least one of which is the conservation of resources. By calculating an appropriate bandwidth to transmit various visual representations at various virtual desktops, the server can priorities which visual representations require a higher or lower bandwidth. By determining that an avatar is closer to a certain virtual desktop, the server can determine to prioritize the visual representation associated with that virtual desktop. This may facilitate the user associated with the avatar to view this visual representation at a higher resolution. Additionally, the virtual desktops that the avatar has moved away from will have associated visual representations displayed at a lower resolution, requiring a lower bandwidth. As such, the transmission capabilities of the various user devices and server are prioritized.

Additionally, if a virtual desktop is not within the visual range of an avatar, the server can cease transmission of visual representations associated with that virtual desktop. This cease of transmission could be caused irrespective of the distance an avatar is to a virtual desktop. For example, a first user may be associated with a first virtual avatar having a first-person perspective. If the first virtual avatar is oriented such that a second virtual desktop is in the field of view of the first virtual avatar, and the first virtual avatar moves within a predetermined distance of the second virtual desktop, the server may cause the transmission of a visual representation associated with the second virtual desktop at a higher resolution. But, if the second virtual desktop is not within the visual range of the avatar, moving within a predetermined distance of the second virtual desktop would not cause transmission of the visual representation.

As discussed briefly above, users may interact with virtual desktops through avatars associated with each user. In embodiments, a first user may select a second virtual desktop, the selection indicating a request to create a virtual gaming sub-environment. Responsive to this selection, the server may cause a connection of the first user computing device to the second user computing device through the server. A virtual gaming sub-environment is then initiated and shared by a second user associated with the second virtual desktop, and the first user. In embodiments, this virtual gaming sub-environment may be hosted by the server, by the first user computing device, or the second user computing device. The second user may also deny the initiation of the virtual gaming environment. For example, if a first user selects the second virtual desktop through the use of the first virtual avatar, an acceptance icon may display on a second user computing device associated with the second user. The second user may then select the acceptance icon indicating either acceptance or denial of the request.

The initiation of the gaming sub-environment may include allowing the first user to interact with a program being executed by the second user computing device. For example, if the second user computing device is executing a racing video game, the gaming sub-environment may comprise an instance of the racing video game in which both the first user and the second user may interact with the assets of the racing video game being executed on the second user computing device. Additionally, the selection of the second virtual desktop could indicated a request to spectate the program being executed by the second user computing device. If this request is accepted by the second user, the display of the second user computing device would be displayed on the first user computing device. In embodiments, this display could comprise a majority of the display area provided by the first user computing device. In further embodiments, the display of the second user computing device could appear as half, or substantially half of the first user's computing device. While the first user is spectating the second user, the display of both the first user and the second user may further display a termination icon. At any point that the first user the second user wishes to end the spectating, either the first user or the second user may select the termination icon. Based on receiving this selection, the spectating will cease.

In additional embodiments, the virtual gaming environment may be populated with a third virtual desktop, the third virtual desktop not being associated with a user or a user computing device. This third virtual desktop may be utilized to initiate a virtual gaming sub-environment hosted on the server. This virtual gaming sub-environment may comprise an instance of a video game such as a racing video game or a fighting video game. The virtual gaming sub-environment may also comprise a streaming service such that multiple users may view the same movie or television show through the third virtual desktop. For example, a first user and a second user, may select the third virtual desktop. Responsive to receiving the selection of the third virtual desktop, the server may initiate a virtual gaming sub-environment shared by the first user and the second user, and hosted on the server. Any number of users may select the third virtual desktop and join the virtual gaming sub-environment.

As used herein, the term real time is used in the context of digital communication through a network. As such, the term real-time does not necessarily refer to instantaneous communication, but rather refers to communication of data in a manner to facilitate presentation of a dynamic digital environment perceivable by a human as in real time or near real time. As such, real time may include any delay caused by computation limitations of a computer device. Additionally, as used herein, rendering refers to the generation of computing assets within a virtual gaming environment or a virtual gaming sub-environment. As such, the rendering of computing assets does not necessarily include causing display of the computing assets. Therefore, as used herein, a computing asset must be rendered before it can be displayed. As such, whether or not it is explicitly stated, any use of the term display as used herein means that a computing asset has been rendered prior to being displayed. Additionally, a computing asset that has been rendered has not necessarily been displayed.

Figure 1B:
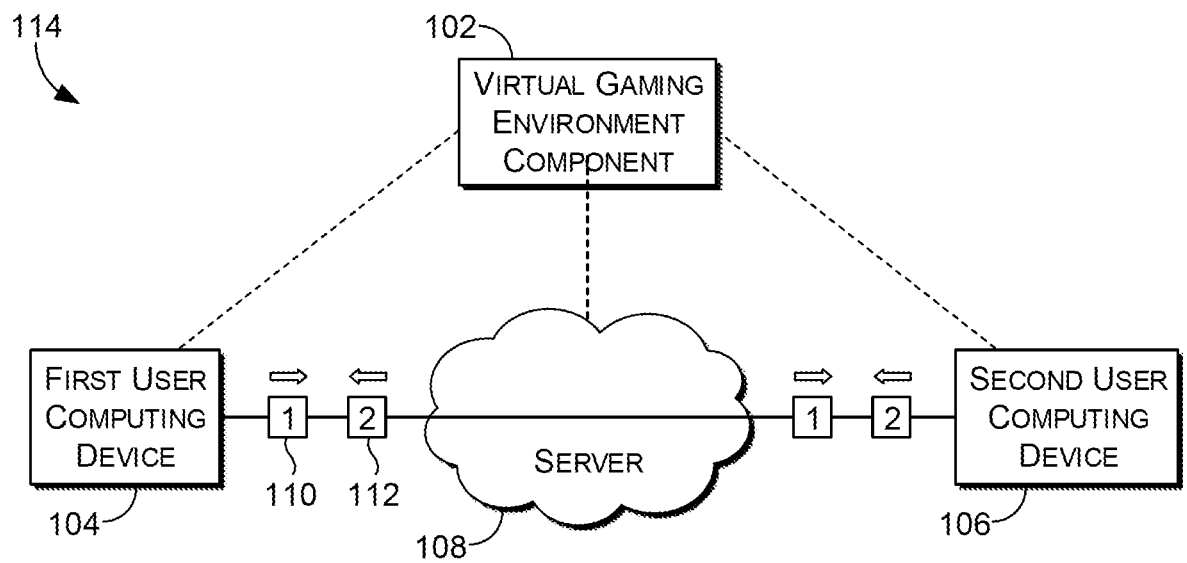

Turning now to FIGS. 1A and 1B, a schematic depiction is provided of an example operating environment 100, in accordance with aspects described herein. It should be understood that this and other arrangements described herein are set forth only as examples. Other arrangements and elements (e.g., machines, interfaces, functions, orders, groupings of functions, etc.) can be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, various functions may be carried out by a processor executing instructions stored in memory.

The operating environment 100 of FIGS. 1A and 1B includes a virtual gaming environment component 102, server 108, a first user computing device 104, and a second user computing device 106. In accordance with aspects of the present disclosure, the server 108 or the virtual gaming environment component 102 can each be a computing device or software or firmware executed by a computing device that is capable of accessing the Internet, or a telecommunications network. The operating environment 100 may also comprise a first user computing device 104 and a second user computing device 106. Each one of the server 108, virtual gaming environment component 102, first user computing device 104 and second user computing device 106 might take on a variety of forms, such as a personal computer (PC), a laptop computer, a mobile phone, a table computer, a wearable computer, a personal digital assistance (PDA), a handheld communication device, a smartphone, a smart watch, a workstation, any combination of these delineated devices, or any other suitable device. Each of the server 108, virtual gaming environment component 102, the first user computing device 104, and the second user computing device 106 may also be implemented via a computing device, such as computing device 1200, later described with reference to FIG. 12, for example. The first user computing device 104 and the second user computing device 106 may also comprise or be communicatively connected to a display screen and graphical user interface, and hardware input devices such as a mouse and key board.

In embodiments, the server 108 provides a service to one or more user computing devices such as the first user computing device 104 and the second user computing device 106 comprising at least generating or facilitating the generation of a virtual gaming environment and facilitating a connection between the first user computing device 104 and the second user computing device 106. The server 108 facilitates the passage of data from the first user computing device 104 to the second user computing device 106, without the need for a direct connection as shown by the broken like within the server 108 of FIG. 1A. This provides fast and efficient passage of data without sacrificing the security of either the first user computing device 104 or the second user computing device 106 or any other user computing device communicatively connected to the server 108. Additionally, a bandwidth at which to transfer a first data packet 110 and a second data packet 112 may be determined by the virtual gaming environment component. Additionally, the server 108 may facilitate a peer-to-peer connection between the first user computing device 104 and the second user computing device 106 as shown by the unbroken line within the server 108 of FIG. 1B.

Additionally, the server 108 may host the virtual gaming environment component 102. As discussed herein, the virtual gaming environment component 102 may be comprised of software, hardware, firmware, or any combination thereof that van be executed by the server 108 to generate a virtual gaming environment. The virtual gaming environment component 102 may also facilitate dynamic communication between the first user computing device 104 and the second user computing device 106. As discussed in detail herein, the virtual gaming environment component can dynamically adjust the bandwidth of the connection between the first user computing device 104 and the second user computing device 106 based on interactions within the generated virtual gaming environment. interactions between the first user computing device 104 and the second user computing device 106. Additionally, the virtual gaming environment component can populate a virtual gaming environment with virtual assets described in detail in relation with FIGS. 2-4C. These virtual assets may include virtual avatars and virtual desktops associated with user computing devices. They may also comprise virtual desktops that are not directly associated with a user computing device. Each of these virtual avatars and virtual desktops may be associated with object script which uses variables and instructions to change presented information and determine how a user views and interacts with the virtual asset. The object scripts may also determine what data is to be received and displayed by the corresponding asset. As such, these object scripts may use information from within the virtual gaming environment to communicate various instructions to the server 108.

The virtual gaming environment component 102 and the server 108 may facilitate communication between the first user computing device 104 and the second user computing device 106 through the use of data packets such as the first data packet 110 and the second data packet 112. The first data packet 110 and the second data packet 112 are units of information collected into one set for transmission between devices and servers. In embodiments, these data packets may be data related to inputs received from the first user computing device 104 or the second user computing device 106 to the server. For example, the first user computing device can be connected to hardware devices such as a mouse and key board. Through the use of this mouse and keyboard, a first user of the first user computing device may move a first virtual avatar throughout the virtual gaming environment. As the first virtual avatar moves throughout the virtual gaming environment, data packets representative of this movement are transmitted to the server, which then facilitates the transmission of these data packets to other user computing devices connected to the virtual gaming environment. As such, the movement of the avatar can be transmitted and rendered on other user computing devices so that other users can see the avatar's movement. The first data packet 110 and the second data packet 112 can also be portions of a stream of data transmitted from either the first user computing device 104 or the second user computing device 106. This stream of data may be related to activities being performed by the user computing devices such as other programs being executed by the user computing devices.

In the embodiment shown in FIG. 1A, the first user computing device 104 and the second user computing device 106 are not directly connected through the server 108 as illustrated by the broken line within the server 108. As an illustrative example, the second user computing device 106 transmits the first data packet 110 to the server 108. The first data packet 110 is then received by the virtual gaming environment component 102. The virtual gaming environment component then forwards the first data packet 110 to the first user computing device 104 which receives the first data packet 110. In embodiments, the virtual gaming environment component 102 may analyze the first data packet 110 to determine that the first data packet 110 does not pose a threat to the first user computing device 104. For example, the virtual gaming environment component 102 may determine that the first data packet 110 does not contain malware, or any other form of harmful software. Additionally, the virtual gaming environment component 102 may act as a dynamically changing gate way, adjusting the bandwidth at which data is transferred between user computing devices. The transfer of the second data packet 112 may traverse this operating environment 100 in the same way as discussed with the first data packet 110. Additionally, any number of user computing devices may be communicatively connected to the server 108. Data packets associated with each user computing device communicatively connected to the server 108 may travers the operating environment 100 as discussed in association with the first data packet 110 and the second data packet 112.

Moving to FIG. 1B, a further embodiment of operating environment 114 is illustrated. Operating environment 114 comprises at least the virtual gaming environment component 102, the first user computing device 104, the second user computing device 106, the server 108, the first data packet 110 and the second data packet 112 as discussed in FIG. 1A. As shown by the line connecting the first user computing device 104 and the second user computing device 106 through the server 108, the virtual gaming environment component 102 may also facilitate a direct, or peer-to-peer connection between the first user computing device 104 and the second user computing device 106. As discussed herein, this peer-to-peer connection may be created in response to various interactions within the virtual gaming environment. For example, a first user of the first user computing device 104 may select a second virtual desktop associated with the second user computing device 106 within the virtual user computing device. This selection may be accomplished through the use of a mouse connected to the first user computing device by using the mouse to click on the second virtual desktop. This selection may also be accomplished by a first user using either a mouse or a keyboard connected to the first user computing device to move the first virtual avatar within a predetermined proximity of the second virtual desktop. Based on receiving the selection, the request to establish a peer-to-peer connection between the first user computing device 104 and the second user computing device 106 may be transmitted to the server 108. Once received by the server 108, the virtual gaming environment component 102 may cause the creation of a peer-to-peer connection between the first user computing device 104 and the second user computing device 106.

Figure 2A:
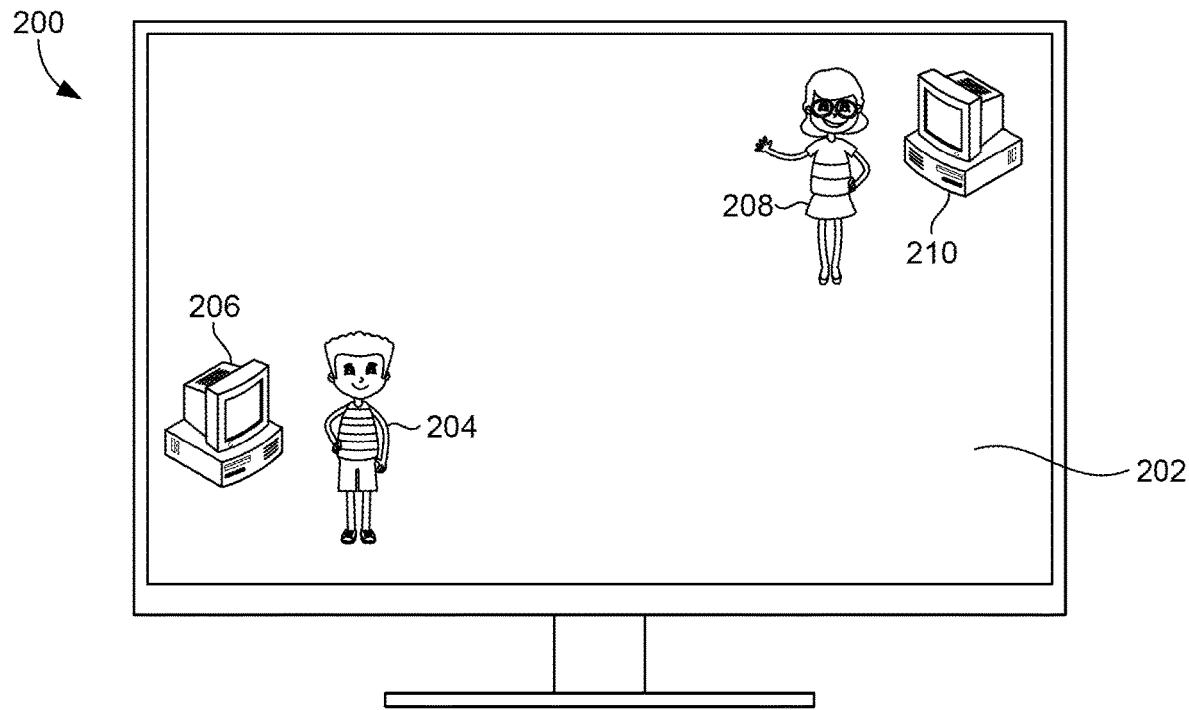
FIGS. 2A and 2B depict example screen views of a shared virtual gaming environment, in accordance with some embodiments of the present disclosure.
Figure 2B:
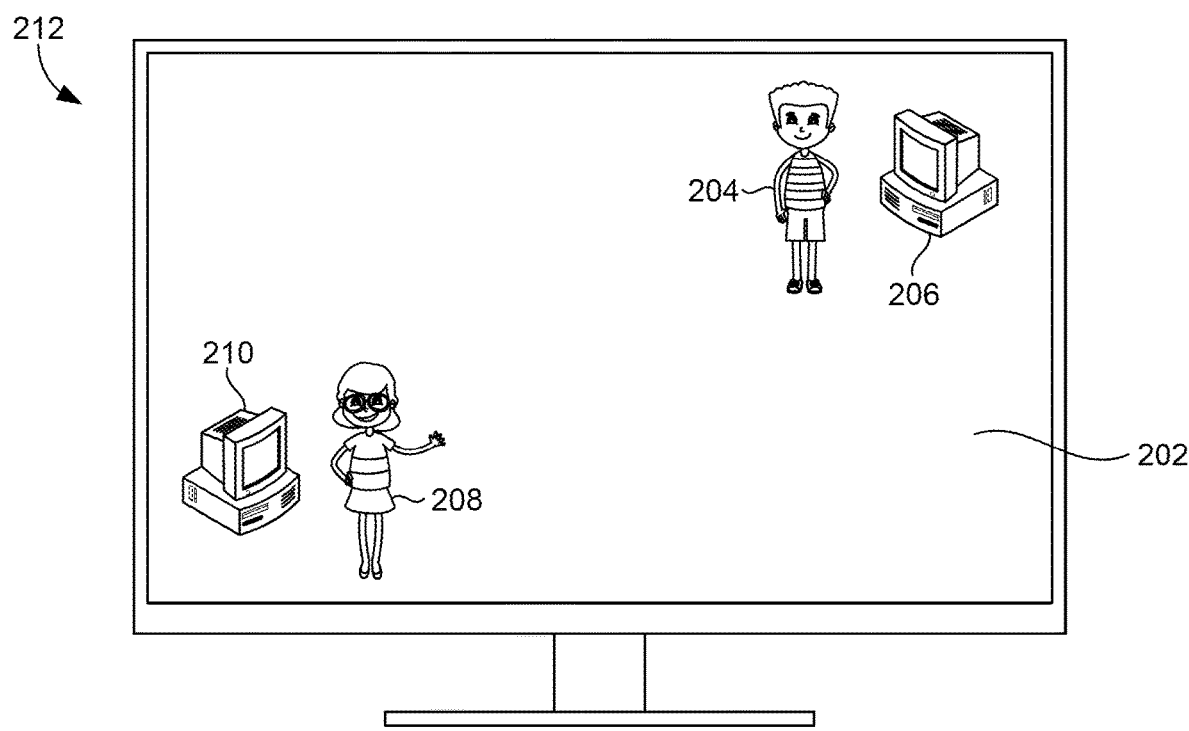

Moving to FIGS. 2A and 2B, example screen views of a virtual gaming environment 202 shared by users is illustrated. This virtual gaming environment 202 may be rendered and displayed at a display of a first user computing device 200 or a display of a second user computing device 212. The first user computing device 200 and the second user computing device 212 may be any form of computing device as discussed in association with the first user computing device 104 and the second user computing device 106 discussed in FIGS. 1A and 1B. The virtual gaming environment 202 is a virtual representation of an environment populated with assets which may be interacted with by a plurality of users and user computing devices and that may represent a plurality of users and user computing devices. By way of an illustrative example, the virtual gaming environment 202 may be represented visually as a room comprising multiple avatars in the form of human individuals, and multiple virtual desktops in the form of desks and desktop computers. The virtual gaming environment 202 may also be populated with assets such as a virtual chalk board, virtual seats, or any number of virtual assets with which the avatars and users may interact.

As discussed herein, a virtual gaming environment 202 may be generated and hosted on a server. A plurality of user computing devices may be communicatively connected to the server and may share the virtual gaming environment 202. When a user computing device is communicatively connected to the server, the virtual gaming environment may be automatically rendered or displayed on each user computing device connected to the server. In embodiments, the virtual gaming environment may be populated with a first virtual avatar 204, a first virtual desktop 206, a second virtual avatar 208, and a second virtual desktop 210. Each of the first virtual avatar 204 and the second virtual avatar 208 may be populated into the virtual gaming environment responsive to an associated user computing device being communicatively coupled to the server hosting the virtual gaming environment.

The first virtual avatar 204 and the second virtual avatar 208 are virtual representations of a user within the virtual gaming environment 202. As such, these virtual avatars may be rendered and displayed as virtual representations of human. The first virtual avatar 204 and second virtual avatar 208 may also take any other form within the virtual gaming environment 202. As way of non-limiting examples, virtual avatars such as the first virtual avatar 204 and the second virtual avatar 208 may take the form of an animal, a 2D image, or a custom form selected by a user. A user may move their avatar throughout the virtual gaming environment. This movement may be facilitated by any suitable input device (e.g., gamepad, keyboard, mouse, touchpad, touchscreen, joystick, and so forth). For example, accomplished by a user interacting with a mouse and keyboard associated with a user computing device. For example, the first user may use a mouse to click on a location within the virtual gaming environment 202, indicating a selection of the area. Based on receiving the selection of the location within the virtual gaming environment 202 the first virtual avatar will move to the selected location within the virtual gaming environment 202. As an additional example, a user may move an avatar throughout the virtual gaming environment through the use of arrow keys or the keys wasd, each key bound to a certain direction (forward, back, left and right).

The first virtual desktop 206 and the second virtual desktop 210 are virtual representation of a user computing device associated with the virtual desktops. The first virtual desktop 206 and the second virtual desktop 210 may be displayed visually within the virtual gaming environment as a desktop computer resting on a table or desk. They may also be displayed as a laptop or any other form of computing device. Additionally, the first virtual desktop 206 and the second virtual desktop 210 as a virtual display screen as discussed in more detail in relation to FIG. 6. Each virtual desktop may be customizable by a user associated with the virtual desktop. These customization can include changes in color, shape, or the addition of virtual assets such as figurines or stickers attached to the virtual desktop. These customizations may be saved in association with the user computing devices associated with the customized virtual desktop. As such, when a user computing device is communicatively connected to the server, the customized virtual desktop associated with the communicatively connected user computing device may be populated into the virtual gaming environment 202.

Each of the virtual assets such as the first virtual avatar 204, second virtual avatar 208, first virtual desktop 206, and second virtual desktop 210 may be populated and rendered into the virtual gaming environment 202 using any suitable technique. In an embodiment, for example, virtual assets may be generated and defined using a programming engine (e.g., Unity®, Unreal Engine® GameMaker®, and so forth) known gaming software such as Unity. These programming engines may also be used to attach object scripts to the virtual gaming assets. These object scripts may be comprised of instructions in any known coding language (e.g., C++, Python, Java, and so forth). One such object script may be attached to the first virtual desktop 206 and a second object script may be attached to the second virtual desktop 210. For example, the first object script attached to the first virtual desktop 206 may be used to determines which user computing device is associated with the first virtual desktop 206 and which user computing device is not associated with the first virtual desktop 206. As described in more detail below, each user computing device may be streaming information to the server hosting the virtual gaming environment 202. When certain threshold conditions are met, a visual representation of this information may be displayed at a virtual desktop associated with the user computing device streaming the information.

Moving back to the example, the first object script attached to the first virtual desktop 206 is used to determine that the user computing device currently displaying the first virtual desktop 206 is the second user computing device 212 which is not associated with the first virtual desktop 206. The first object script is also used to determine that the first user computing device 200 which is associated with the first virtual desktop 206 is currently streaming data to the server hosting the virtual gaming environment 202. Next, utilizing the object script attached to the first virtual desktop 206, it is determined that the first virtual desktop 206 is currently being displayed on a display of the second user computing device 212. This determination may be made based on instructions utilizing for example Boolean variables, such as 1 representing currently being displayed and 0 representing not currently being displayed. Based on this determination, the object script is used to communicate a request to the server to stream data from the first user computing device 200 to the second user computing device 212, the stream of data being a visual representation of the activities being performed by the first user computing device 200. Based on receiving this request, the server facilitates the transmission of the data to the second user computing device 212 causing the visual representation to be displayed at the first virtual desktop 206 on the display of the second user computing device 212. As discussed in detail with relation to FIG. 5 and FIG. 6, the position of the avatars in relation to virtual desktops may be used to increase or decrease the bandwidth, frame rate, resolution, and transmitted bitrate associated with streams of data. Also, as discussed in relation to FIGS. 3A and 3B, the activities being performed by a user computing device may be any other program being executed by the user computing device, such as a video game.

The first virtual avatar 204 and the first virtual desktop 206 may be associated with the first user computing device 200. Additionally, the second virtual avatar 208 and the second virtual desktop 210 may be associated with a second user computing device 212. In additional embodiments, the virtual gaming environment 202 may be populated with any number avatars and virtual desktops associated with their respective user computing devices. The virtual gaming environment 202 as well as the first virtual avatar 204, first virtual desktop 206, the second virtual avatar 208, and the second virtual desktop 210 may be displayed at a display of both the first user computing device 200 and the second user computing device 212. FIG. 2A illustrates a perspective of a first user associated with the first user computing device 200 and FIG. 2B illustrates a perspective of a second user associated with the second user computing device 212. Additionally, as discussed in further detail herein, the virtual desktops may also display activities being performed by a user computing device associated with that virtual desktop.

In embodiments, the virtual avatar associated with the user computing device is not displayed in the virtual gaming environment. In this embodiment, the perspective shown at the display of the first user computing device 200 is a first-person perspective of first virtual avatar 204. When the first user computing device 200 shows a first person perspective, the display of the first user computing device 200 shows a perspective of the virtual eyes of the first virtual avatar 204. Therefore, while displaying this first person perspective of the first virtual avatar 204, the first virtual avatar 204 would not be included in the display of the first user computing device 200. The virtual gaming environment 202 may also be displayed in a third person perspective, a fixed perspective, or any other perspective used in gaming technologies.

Figure 3A:
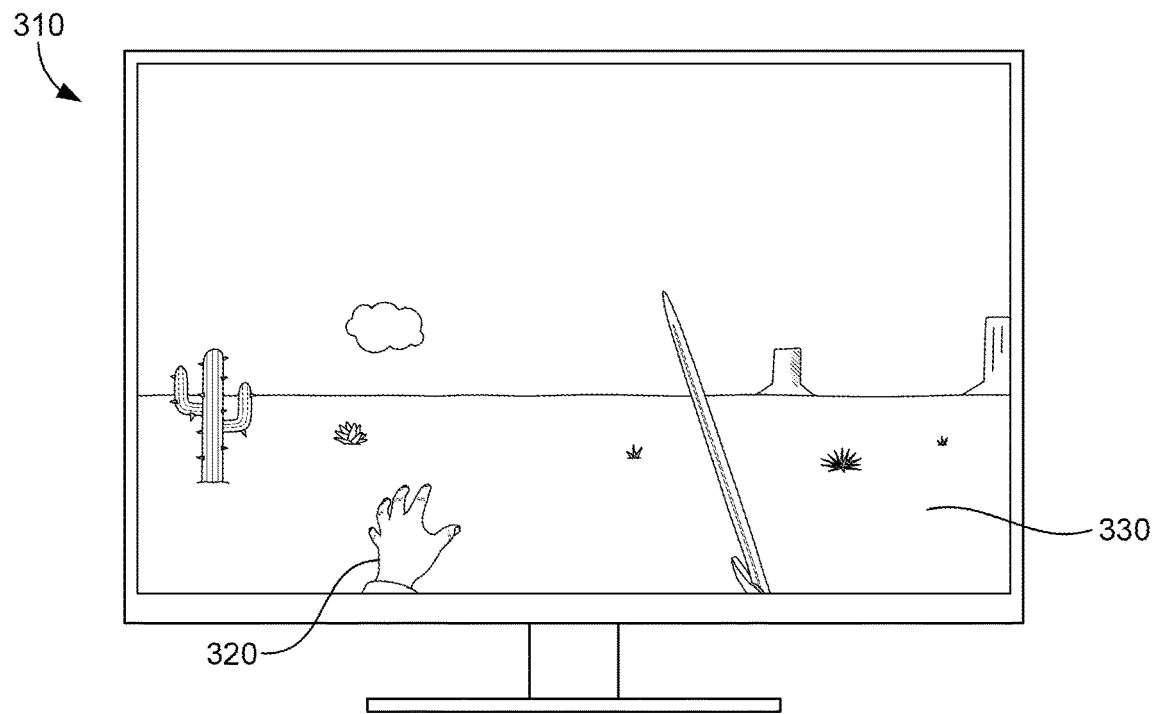
FIG. 3A depicts an example screen view of an exemplary program executing on a user computing device.
Figure 3B:
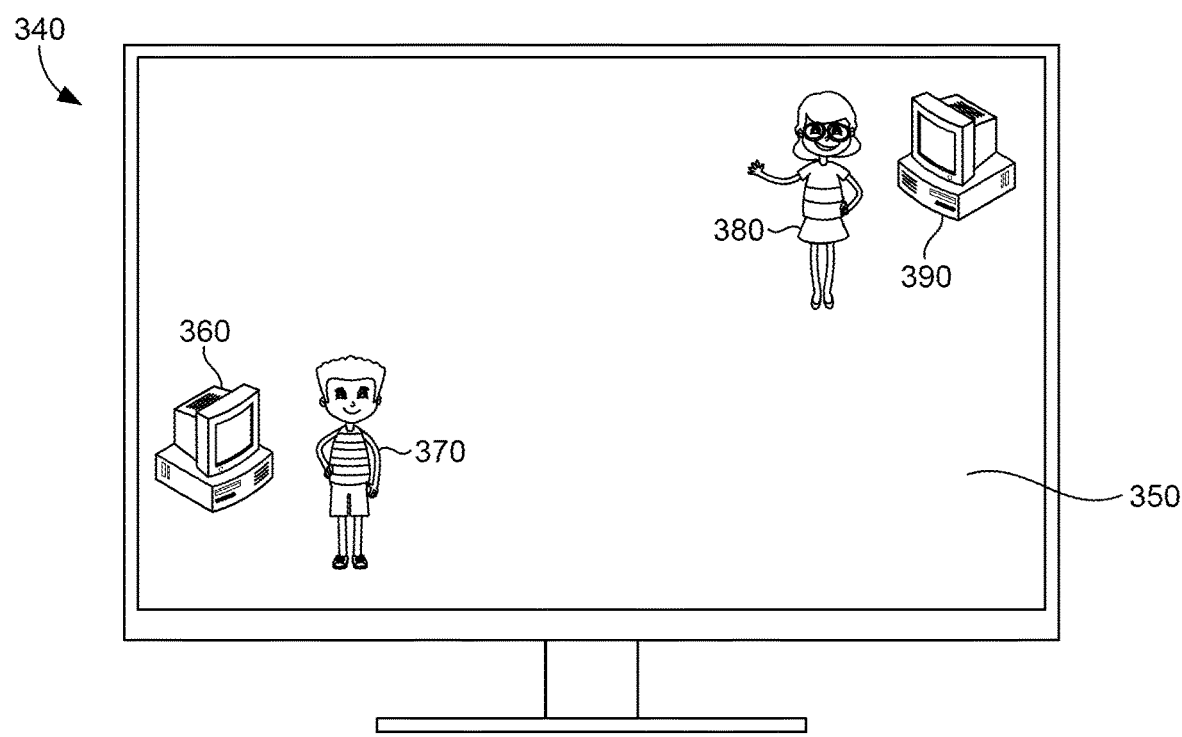
FIG. 3B depicts an example screen view of a shared virtual gaming environment executing on the same user computing device, in accordance with some embodiments of the present disclosure.

A user may also interact with other avatars or other virtual desktops within the virtual gaming environment 202. For example, a user may select the second virtual avatar 208. This selection may indicate a request to communicate with the user associated with the second virtual avatar 208. Similarly, a user may select a virtual desktop not associated with the user. This selection may be used to interact with virtual desktops in multiple ways. For example, a first user associated with the first virtual avatar 204 may select the second virtual desktop 210. This selection indicates a request to view the activities being performed by the second user computing device 212. As discussed in further detail with references to FIGS. 3A and 3B, a user computing device may be executing the virtual gaming environment 202 along with other programs. The virtual gaming environment and other programs may be displayed at a single display screen of a user computing device. Or, as illustrated in FIGS. 3A and 3B, a user computing device may be associated with two separate display screens. In this embodiment, the virtual gaming environment 202 may be displayed on a first screen, and the other programs may be displayed on a second screen.

Moving to FIGS. 3A and 3B, example screen views of an exemplary program executing on a user computing device, and example screen views of a shared virtual gaming environment executing on the same user computing device are illustrated. The first virtual avatar 370, the first virtual desktop 360, the second virtual avatar 380, and the second virtual desktop 390 are analogous to the first virtual avatar 204, the second virtual avatar 208, the first virtual desktop 206, and the second virtual desktop 210, discussed in association with FIGS. 2A and 2B. In embodiments, a first user computing device may display both the virtual gaming environment 350 and a program being executed by the first user computing device 330 on a first display screen 310 of the user computing device and a second display screen 340 of the user computing device. In embodiments, the first display screen 310 and the second display screen 340 may be any form of hardware such as an LED screen capable of displaying activities being performed by a user computing device. The program being executed by the first user computing device 330 may be any program capable of being executed by a user computing device. For example, the program being executed by the first user computing device 330 may be a word processor, a video streaming service, or a video game program. In embodiments, the program being executed by the first user computing device 330 may comprise at least a gaming sub-environment virtual avatar 320 used to interact with the program being executed by the first user computing device 330.

As such, when a second user associated with a second virtual avatar 380 selects the first virtual desktop 360 associated with the first user computing device, the second user may request to interact with the first virtual desktop 360 in multiple ways. For example, a selection of the first virtual desktop 360 by the second user may indicate a request to view the programs being executed by the first user computing device 330. If the first user indicates an acceptance of this request, the virtual gaming environment component may cause the display of either the activities being displayed by first display screen 310 or the activities being displayed by the second display screen 340 at a virtual display screen of the first virtual desktop 360. Additionally, the activities being displayed by the first display screen 310 or the activities being displayed by the second display screen 340 may be caused to display in a full screen manner on the user computing device associated with the second virtual desktop 390. As such, in this embodiment, the selection of the first virtual desktop 360 may cause the second user computing device to display the activities displayed on either the first display screen 310 or the second display screen 340.

Similarly, if the second user indicates a request to create a virtual gaming sub-environment by selecting the first virtual desktop 360, the virtual gaming environment component may facilitate a connection between the first user computing device and the second user computing device through a server hosting the virtual gaming environment. This connection allows the first user to interact with the activities being displayed on the first display screen 310 or the second display screen 340. As way of an example, the first user computing device is executing the virtual gaming environment 350 and displaying the virtual gaming environment on a second display screen 340, and is executing a video game program and displaying the video game program on the first display screen 310. A second user associated with a second user computing device then selects the first virtual desktop 360 within the virtual gaming environment and indicates a request to join the video game program being executed by the first user computing device. A connection between the first user computing device and the second user computing device is facilitated through a server hosting the virtual gaming environment 350. This connection allows the first user to interact with the video game program being executed by the first user computing device. Inputs received at the second user computing device are transmitted to the server hosting the virtual gaming environment and are forwarded to the second user computing device. This virtual gaming sub-environment may be hosted on the server, or may be a program currently executing on the first user computing device. As such, it is to be understood, that the virtual gaming environment 350 may be executed on a user computing device along with any other program being executed by the user computing device 330.

Figure 4:
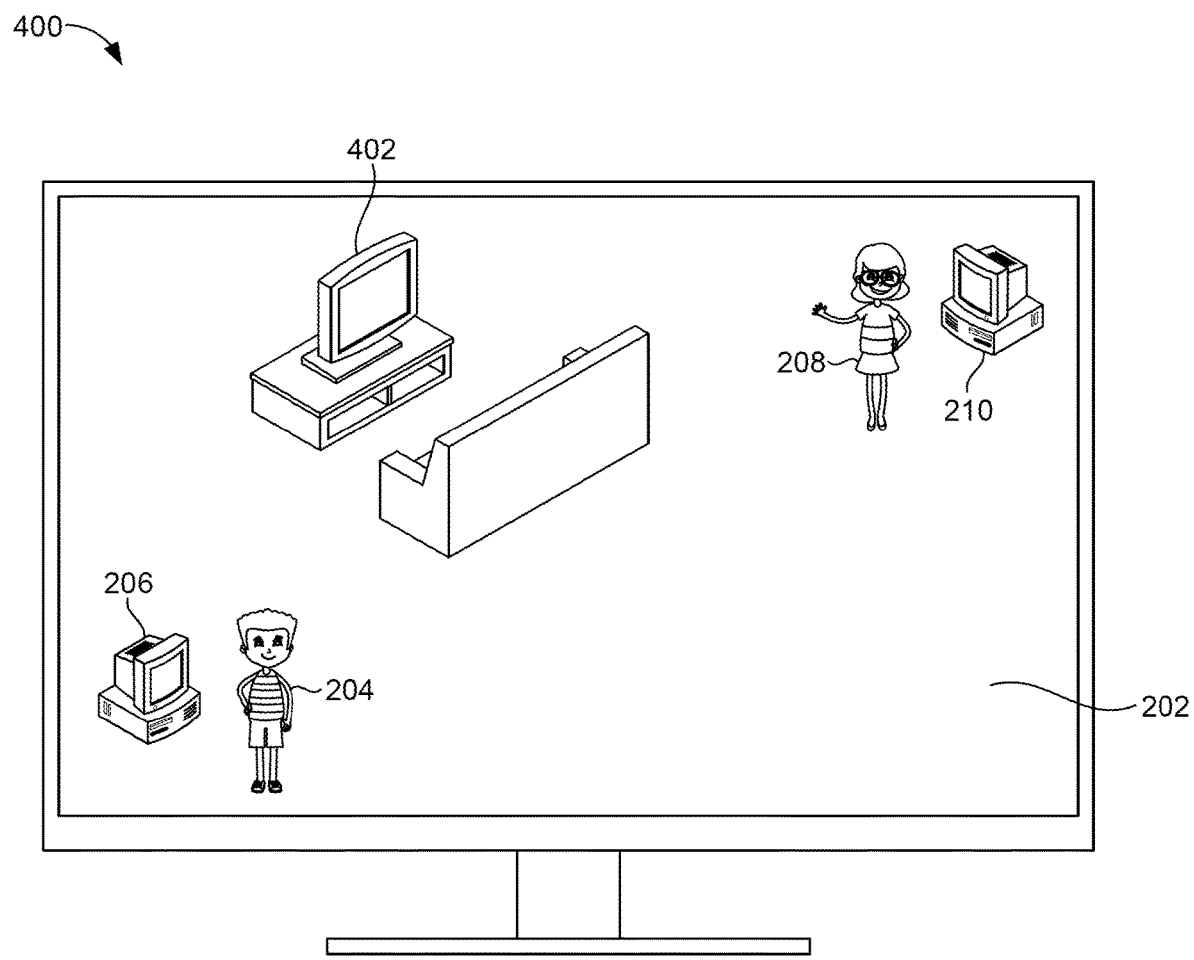
FIG. 4 depicts another example screen view of a shared virtual gaming environment, in accordance with some embodiments of the present disclosure.

Moving to FIG. 4, another example screen view of a shared virtual gaming environment is illustrated. In this embodiment, the user computing device 400 displays a first virtual avatar 204, a first virtual desktop 206, a second virtual avatar 208, a second virtual desktop 210, and a third virtual desktop 402. As with the embodiment displayed in FIGS. 2A and 2B, the first virtual avatar 204 and the first virtual desktop 206 are associated with a first user computing device, and the second virtual avatar 208 and second virtual desktop 210 are associated with a second user computer. For this example, the first virtual avatar 204 and first virtual desktop 206 are associated with the user computing device 400. In embodiments, the third user computing device may be any device or combination of devices as described in association to the first user computing device 104 and the second user computing device 106 described in association with FIGS. 1A and 1B. The third virtual desktop 402 is a virtual asset that is not associated with any particular user computing device, and may be visual represented in a number of ways. For example, the third virtual desktop 402 may be rendered and displayed as a virtual television set or a virtual desktop computer similar to the first virtual desktop 206 and the second virtual desktop. The third virtual desktop 402 represents a virtual asset that allows for collaboration, co-operative gaming, and collective use of streaming or video services. Similar to the first virtual desktop 206 and the second virtual desktop 210, the third virtual desktop may be associated with an object script comprising various instructions. In embodiments, a selection of the third virtual desktop 402 may be received from either the first virtual avatar 204, the second virtual avatar 208, or both. Selection of the third virtual desktop 402 may cause the third virtual desktop 402 to display information.

For example, the first user associated with the first virtual avatar 204 may select a streaming option associated with the third virtual desktop 402. The selection of this streaming option may cause the third virtual desktop 402 to display a stream of information such as a video stream. In embodiments, this video stream may display within the virtual gaming environment on only the first user's computing device. In additional embodiments, the video stream may display within the virtual gaming environment on all user computing devices associated with all avatars. In additional embodiments, the third virtual desktop 402 may be selected by the first user associated with the first virtual avatar 204 and the second user associated with the second virtual avatar 208. Based on receiving the selection by both users, a virtual gaming sub-environment is generated. This virtual gaming sub-environment may take any number of forms. For example, the virtual gaming sub-environment may be a split screen video game as discussed herein with reference to FIGS. 7A and 7B. In additional embodiments, the virtual gaming sub-environment may display in full screen as discussed herein with reference to FIGS. 8A and 8B. Similarly, the selection of the second virtual desktop 210 by a user associated with the first virtual avatar 204 may cause the generation of a virtual gaming sub-environment shared by a first user computing device associated with the first virtual avatar 204 and a second user computing device associated with the second virtual avatar 208. This is discussed in further detail in relation to FIGS. 7A and 7B and FIGS. 8A and 8B.

Figure 5:
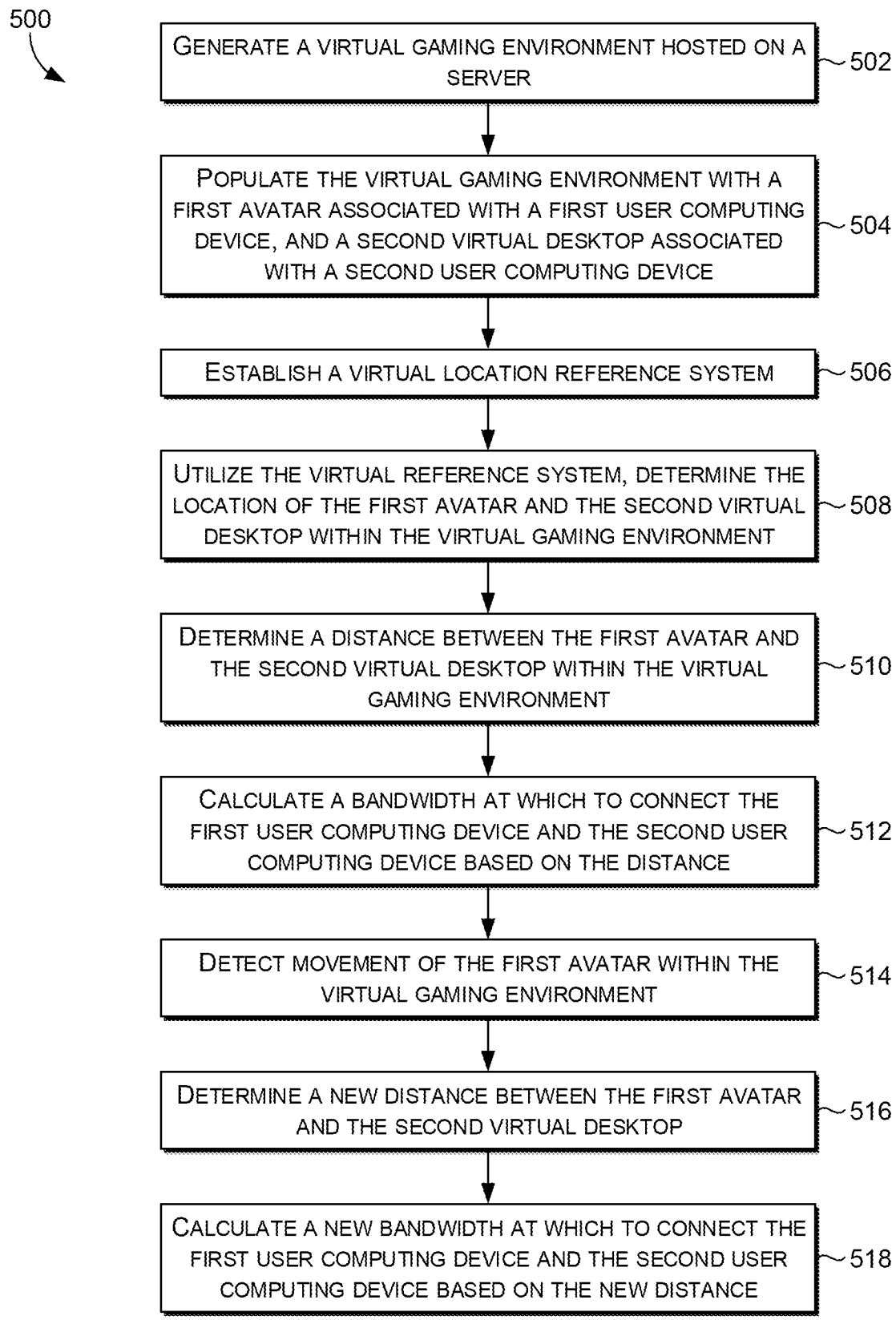
FIG. 5 depicts an example method for dynamically adjusting bandwidth between user devices.

FIG. 5 depicts a process 500 for dynamically adjusting a bandwidth used to transmit data to and from user computing devices. Generally, process 500 may facilitate the changes to the bandwidth of data communicated to a user computing device based on the relative position of objects within a virtual gaming environment (e.g., virtual gaming environment 202 of FIGS. 2 and 4). As depicted, process 500 may include, at step 502, generating a virtual gaming environment (e.g., virtual gaming environment 202) is generated and hosted on a server (e.g. server 108).

At step 504, embodiments of process 500 the virtual gaming environment is populated. For example, virtual gaming environment 202 may be populated with a first virtual avatar associated with a first user computing device, and a second virtual desktop associated with a second user computing device. Each virtual asset, such as the first virtual avatar and second virtual desktop, may include one or more object scripts. An object script may define properties of the asset. For example, how the asset interacts with other assets, how assets are displayed within the virtual gaming environment, or any other property.

A virtual location reference system is established at step 506. This virtual location reference system may use known methods such as vector positioning to establish the location of assets. For example, once assets are populated into the virtual gaming environment, an area for the virtual gaming environment may be determined. This area of the virtual gaming environment could be measured in any manner suitable to the reference frame of the virtual gaming environment. For example, the virtual gaming environment may be a 3 dimensional representation of a room of a predetermined square footage. Once the boundaries of the virtual gaming environment are determined, such as 100 square feet of 20 square feet, the position of each virtual asset within this area may be determined. The boundaries may also be set as a circle of a certain radius or circumference. For example, vectors may be used to determine the positions such that each virtual asset's position is determined form the center of the virtual gaming environment area. The virtual location reference system may also be used to determine the position of each asset with relation to each other asset in the virtual gaming environment. For example, it may be used to determine that a first virtual avatar is 2 virtual feet from a first virtual desktop and 15 virtual fee from a second virtual desktop. This virtual location reference system may also be used to determine the direction along with distance.

Some embodiments of process 500, at step 508, include computing the locating the first virtual avatar and the second virtual desktop within the virtual gaming environment. For example, the locations of each asset corresponding to the avatar and the virtual desktop may be determined within the reference frame the virtual gaming environment, as described above.

At step 510, the distance between the first virtual avatar and the second virtual desktop is determined within the virtual gaming environment. For example, the virtual location reference system may determine that the first virtual avatar is located at a first location and the second virtual desktop is located at a second location and that the first location is 20 virtual feet from the second location. The computed distance may be provided as an input value to the object script of each asset. For example, the computed distance may also used to evaluate whether or not the first virtual avatar is within a predetermined threshold of the second virtual desktop. In some embodiments, an asset may have one or more defined thresholds. Which threshold the distance falls within is used in calculating a bandwidth at which to connect the first user computing device and the second user computing device.

At step 512, process 500 may include computing a bandwidth at which to connect the first user computing device and the second user computing device based, at least in part, on the calculated distance. At step 514, movement of the first virtual avatar within the virtual gaming environment is detected. The virtual location reference system may be used to determine the movement of avatars throughout the environment based on detecting a change in the position of the avatars of periods of time. A new distance between the first virtual avatar and the second virtual desktop is then determined at step 516. Based on this new distance a new bandwidth at which to connect the first user computing device and the second user computing device is calculated at step 518.

Figure 6A:
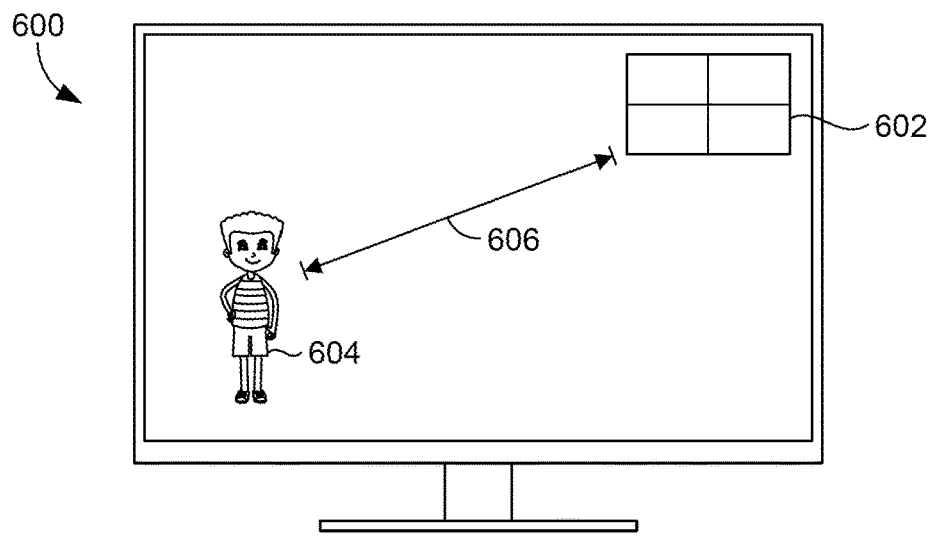
FIGS. 6A-6C depict example screen views of a shared virtual gaming environment, wherein an avatar is within three unique distances of a virtual desktop, in accordance with some embodiments of the present disclosure.
Figure 6B:
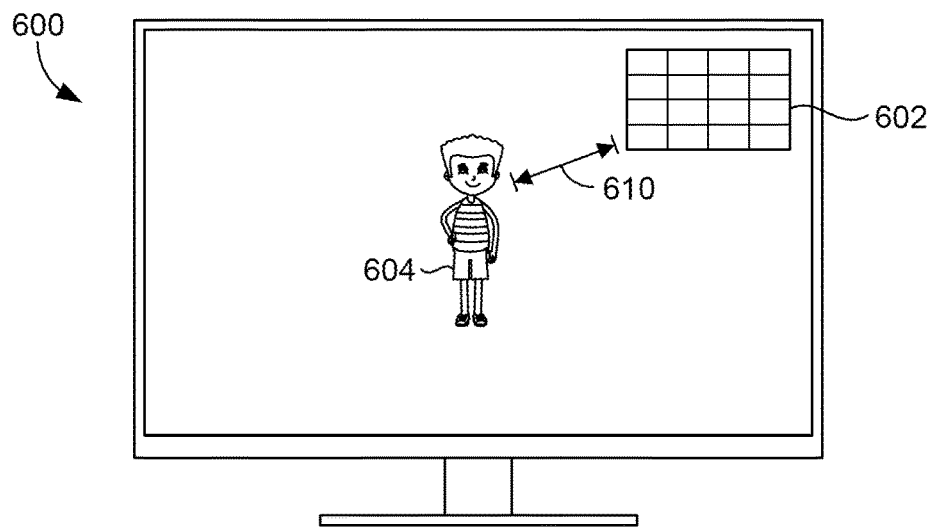
Figure 6C:
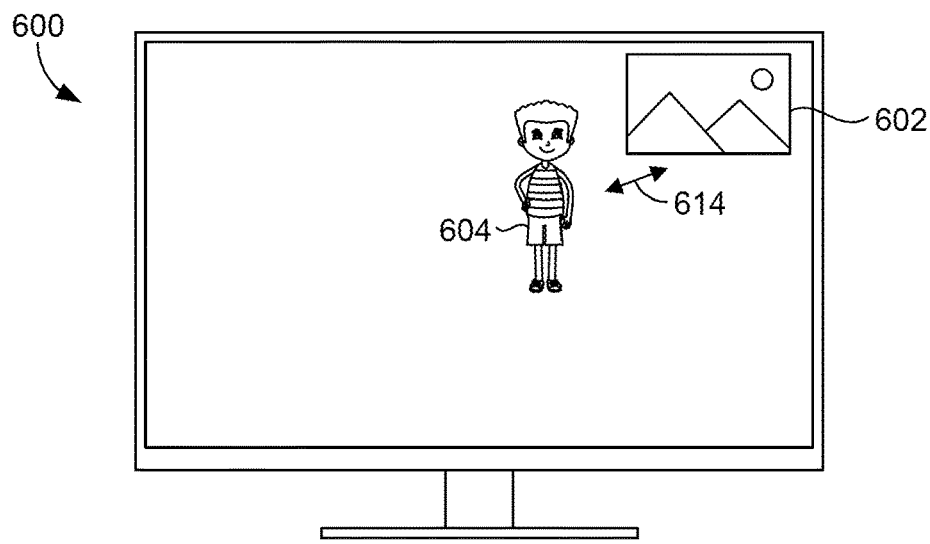

Moving to FIGS. 6A-6C, example screen view of a shared virtual gaming environment, wherein an avatar is within three distances of a virtual desktop are illustrated. As displayed in FIGS. 6A-6C, a virtual gaming environment may comprise at least a first virtual avatar 604, and a virtual display screen 602 associated with a virtual desktop and displayed by user computing device display screen 600. Each of the first virtual avatar 604, the virtual desktop, and the user computing device display screen 600 may comprise any or all of the aspects of virtual avatars, virtual desktops, and user computing devices as used herein. The virtual display screen 602 is a virtual asset within the virtual gaming environment and may be rendered and displayed as a display screen of a virtual desktop. As such, the virtual display screen 602 may act as a virtual display corresponding to a physical display of an associated user computing device. This virtual display screen 602 may display a stream of information associated with a visual representation of the activities being performed by an associated user computing device.

In embodiments, each virtual desktop populated into the virtual gaming environment may be associated with a virtual display screen such as the virtual display screen 602. This virtual display screen 602 can act in ways similar to a display screen of a user computing device associated with that virtual desktop. This virtual display screen 602 can display the activities being performed by the user computing device. For example, if the user computing device associated with the virtual desktop is executing a video game of tic tac toe, the virtual display screen 602 of the virtual desktop can display a visual representation of the video game of tic tac toe executing on the user computing device. In some embodiments, a user computing device may have two display screens, one displaying the virtual gaming environment, the second displaying a separate program executing on the user computing device, such as a video game of tic tac toe. In this embodiment, the user may choose to display the video game of tic tac toe displayed on the second screen, at the virtual display screen 602 of the virtual desktop.

As discussed in relation to FIG. 5, the positions of virtual avatars and virtual desktops may be determined by a virtual location reference system. Based on these determined positions in relation to one another, the bandwidth between various user computing devices may be dynamically adjusted. In addition to adjusting the bandwidth and bitrate, the resolution, frame rate, at which visual representations of programs executed by user computing devices may also be dynamically adjusted. For example, if the first virtual avatar 604 is within a predetermined proximity of the virtual display screen 602, and the virtual display screen 602 is within the screen view of a first user associated with the first virtual avatar 604, the virtual display screen 602 of the virtual desktop may display a visual representation of the activities being performed by the user computing device associated with the virtual display screen 602. As used herein, a screen view refers to the current perspective of display of a user computing device. For example, if the current perspective of the display of a user computing device is a first person perspective of an avatar, the screen view would only display information viewed through the virtual eyes of the avatar. As such, the screen view of a user computing device changes as the player rotates, or for a third person perspective, when the user moves the screen view about the avatar.

The visual representation displayed by the virtual display screen 602 may be displayed at various resolutions, various frame rates, and may be streamed in real time. As such, a first user viewing the virtual display screen 602 of the virtual desktop would be able to view the activities that the user computing device associated with the virtual display screen 602 is performing in real time. For example, if the user selects the top left tic tac toe box with an X, the virtual display screen 602 would display, in real-time, the selection and displaying of an X in the top left tic tac toe box.

Additionally, if the virtual desktop is not displayed on the first user computing device associated with the first virtual avatar, the virtual display screen 602 will not be rendered or displayed on the first user computing device. For example, if the perspective of the first virtual avatar is a first person perspective, the first virtual avatar could be within the predetermined distance in the virtual gaming environment but facing away from the virtual display screen 602. As the virtual display screen 602 is not displayed on the first user computing device, the virtual display screen 602 would not be rendered or displayed on the first user computing device. This allows for the prioritization of information most relevant to a user, namely, the information that a user chooses to view, and information that is closest to the first virtual avatar 604 in the virtual gaming environment. This prioritization of what to render and what to display saves processing power and memory storage for user computing devices communicatively connected to the server hosting the virtual gaming environment.

Additionally, the resolution and frame rate at which the virtual display screen 602 displays the activities being performed by the associated user computing device may be adjusted. In embodiments, this resolution is determined based on a distance which the first virtual avatar 604 is located from the virtual display screen 602. As the resolution is adjusted, the bandwidth is adjusted to accommodate the increased data transfer as discuss in FIG. 5. As shown in FIG. 6A, when it is determined that the first virtual avatar 604 is located at a first distance 606 from the virtual display screen 602 the virtual display screen 602 displays the activities being performed by the associated user computing device. The four squares of virtual display screen 602 in FIG. 6A are a representation of a number of pixels that make up the resolution of the virtual display screen 602. This is not meant to indicate that virtual display screen 602 is comprised of only four pixels, but is instead meant as a representation of the increase or decrease of pixels based on the determined distance. The adjustment to the resolution as well as the adjustment to bandwidth discussed below may be accomplished by a program associated with the server 108 such as the virtual gaming environment component 102 discussed in FIGS. 1A and 1B.

As shown in FIG. 6B, when the first virtual avatar 604 moves closer to the virtual display screen 602 and is located at a second distance 610 that is closer to the virtual display screen 602 than the first distance 606, the resolution of the virtual display screen 602 increases. Thus, the number of pixels used to represent the activities being performed by the associated user computing device increases, as indicated by the increased number of squares in the virtual display screen 602 of FIG. 6B. Additionally, if the first virtual avatar 604 moves even closer than the second distance 610, namely, to a third distance 614, a peer-to-peer connection may be established between a first user computing device associated with the first virtual avatar 604 and a second user computing device associated with the virtual display screen 602. This peer-to-peer connection facilitates a display of the activities being performed by the second user computing device at the virtual display screen 602 at the resolution at which it is displayed on a display screen associated with the second user computing device. As such, the first user computing device would display the activities being performed by the second user computing device at the virtual display screen 602 as if the first user was actually looking at a display of the second user computing device. As such, the farther the first virtual avatar 604 is away from the virtual display screen 602, the lower the resolution of the virtual display screen 602.

If the first virtual avatar 604 is sufficiently far away, the stream of the activities being performed by the user computing device associated with the virtual display screen may be terminated. In place of the stream, a still digital image may be displayed at virtual display screen 602. As such, processing power, memory, and bandwidth may be preserved for other streams that are closer to the first virtual avatar 604. The still digital image may be the last image streamed from the user computing device associated with the virtual display screen 602. The digital image may also be representative of the activities being performed by the associated user computing device. For example, if the associated user computing device was executing a video game, the still digital image may be artwork that represents the video game, such as the associated video game box art.

In addition to adjusting the resolutions at various distances, the bandwidth used to stream the activities being performed by the user computing device at the adjusted resolutions may be adjusted. As the resolution increases or decreases based on proximity, so may the bandwidth. If the user is located at the first distance 606, the bandwidth may be adjusted such that the stream of the activities may be displayed at the virtual display screen 602 at the adjusted resolution in real time. As such, the bandwidth of the various connections between user computing devices and the server may be constantly adjusted to prioritize data being streamed from user computing devices associated with various virtual display screens.

The closer an avatar is to a virtual display screen, the higher the resolution of the virtual display screen, and the higher the bandwidth used to connect the user computing device associated with the avatar, and the user computing device associated with the virtual display screen through the server. As discussed in FIGS. 1A and 1B, the plurality of user devices communicatively connected to the server 108 are not directly connected to one another. Instead, they are each communicatively connected to the server which facilitates the transmission of data between user computing devices. As such, a component such as the virtual gaming environment component 102 may be used to adjust the bandwidths of the various connections facilitated through the server 108. This dynamic adjusting of bandwidth allows for the conservation of computing resources as information less relevant to a user, the virtual display screens farther from a virtual avatar, are transmitted at a lower quality through a lower bandwidth than information more relevant to a user, the virtual display screens closer to the first virtual avatar 604. In this way, the virtual gaming environment facilitates streams of information from multiple user computing devices but controls the bandwidth in such a way that the user computing device and server resources are conserved and efficiency is maximized. Also as discussed in reference to FIG. 1B, the server 108 may facilitate a direct, peer-to-peer connection between user computing devices. When the first virtual avatar 604 is at a third distance 614, the virtual gaming environment component may cause a peer-to-peer connection between the user computing device associated with the first virtual avatar 604, and the user computing device associated with the virtual display screen 602. As the bandwidth is lowered to facilitate lower resolution streams, the data streaming from a user computing device may be compressed using known compression algorithms such as H.264/AVC or H.265/HEVC. The compression of the stream allows for the lower resolution to be streamed through the lowered bandwidth while maintaining a real time representation of the activities being performed by a user computing device.

Figure 7A:
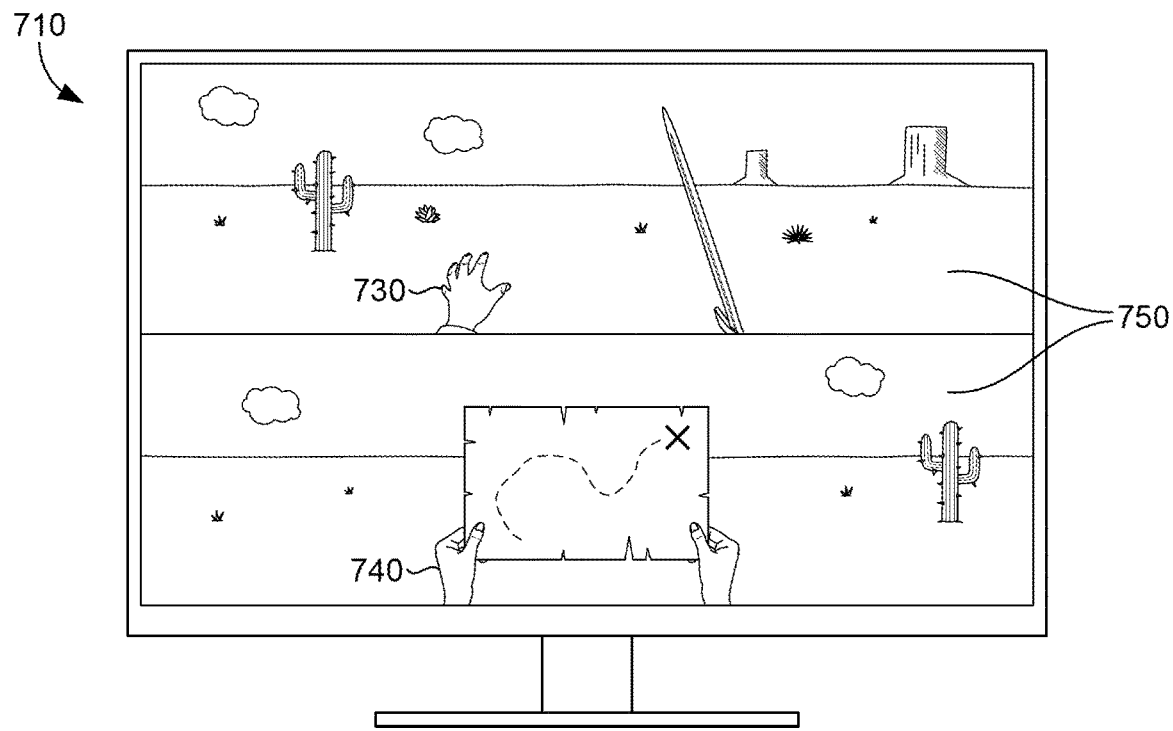
FIGS. 7A and 7B depict example screen views of a shared virtual gaming sub-environment, in accordance with some embodiments of the present disclosure.
Figure 7B:
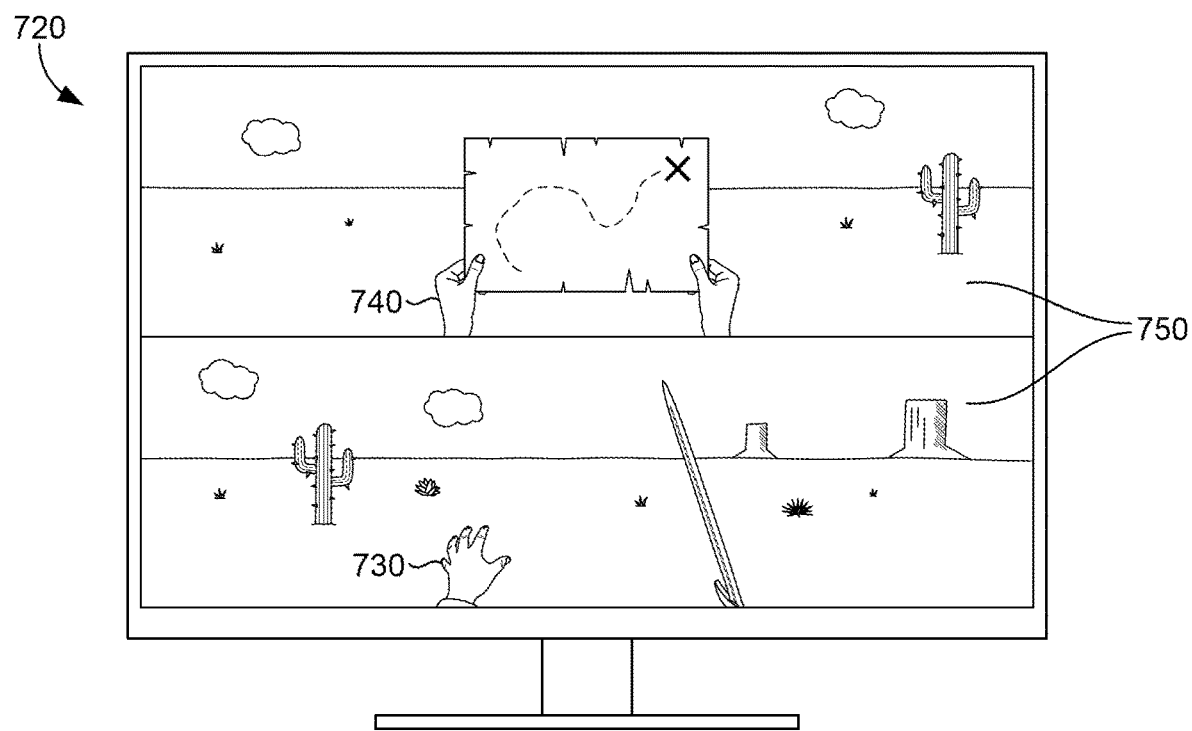

Moving to FIGS. 7A and 7B, example screen views of a shared virtual gaming sub-environment are illustrated. As discussed in relation to FIG. 4, users may select the third virtual desktop 402 this selection indicating a request to create a virtual gaming sub-environment 750. This virtual gaming sub-environment may be populated with gaming assets including at least a first sub-environment virtual avatar 730 associated with a first user computing device associated with the first user and a second sub-environment virtual avatar 740 associated with a second user computing device associated with the second user. This virtual gaming sub-environment 750 is shared by the first sub-environment virtual avatar 730 and the second sub-environment virtual avatar 740. This virtual gaming sub-environment may be displayed on a first display screen 710 associated with the first user computing device and a second display screen 720 associated with the second user computing device. The first user and the second user may interact with each other through the manipulation of the first sub-environment virtual avatar 730 and the second sub-environment virtual avatar 740. In embodiments, this virtual gaming sub-environment may take the form of a video game such as a racing game, a fighting game, or any other form of video game. As shown in FIG. 7A and FIG. 7B, this virtual gaming sub-environment 750 may be displayed on a display of a first display screen 710 and on a display of a second display screen 720 in a split screen format. As such, screen views of both the first sub-environment virtual avatar 730 and the second sub-environment virtual avatar 740 are displayed on both displays. Additionally, this virtual gaming sub-environment 750 is hosted on the server, such as the server 108 discussed in FIGS. 1A and 1B.

While the virtual gaming sub-environment 750 is shared by the first user computing device and the second user computing device, the first user computing device and the second user computing device do not need to be directly connected. Instead, their connection to the server facilitates the transfer of information between the first user computing device and the second user computing device through the server, as discussed in relation to FIG. 1A. This avoids the need for a direct connection between the first user computing device and the second user computing device which allows each computing device to remain protected. As mentioned throughout, a direct connection between two user computing devices can leave the devices vulnerable to attacks by those devices that are directly connected. By facilitating the transfer of information through the server, this vulnerable state can be avoided.

Figure 8A:
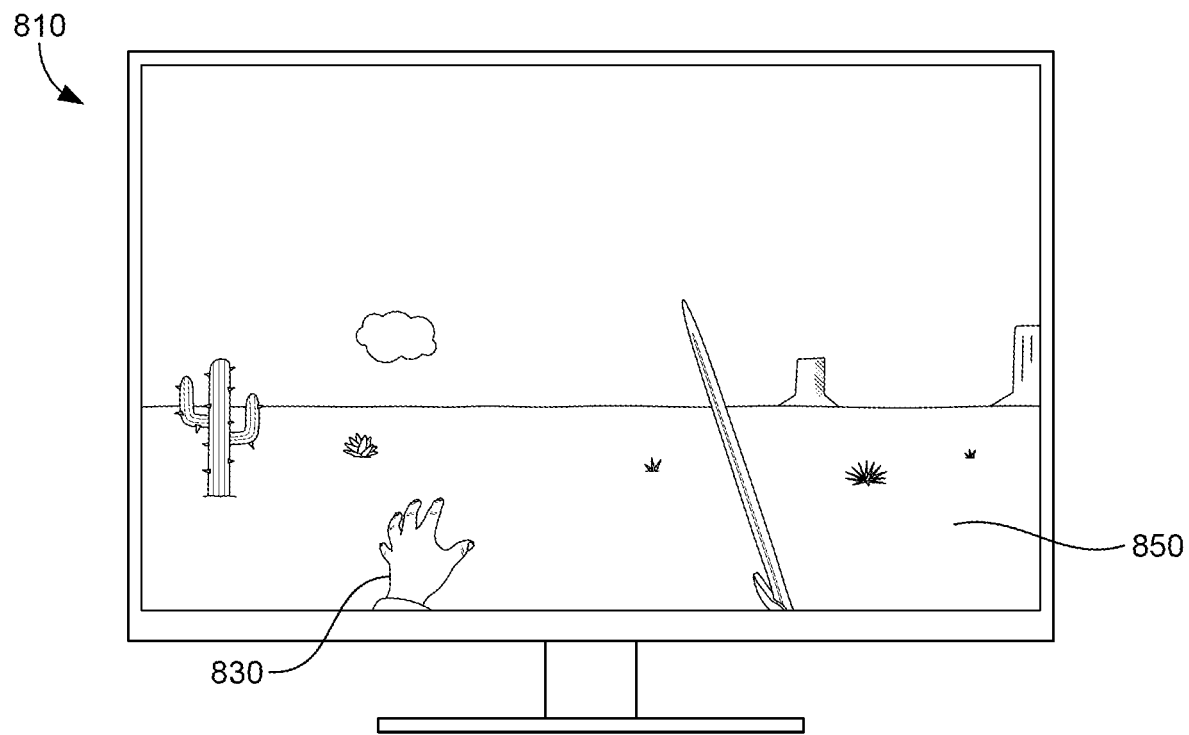
FIGS. 8A and 8B depict another example screen views of a shared virtual gaming sub-environment, some embodiments of the present disclosure.
Figure 8B:
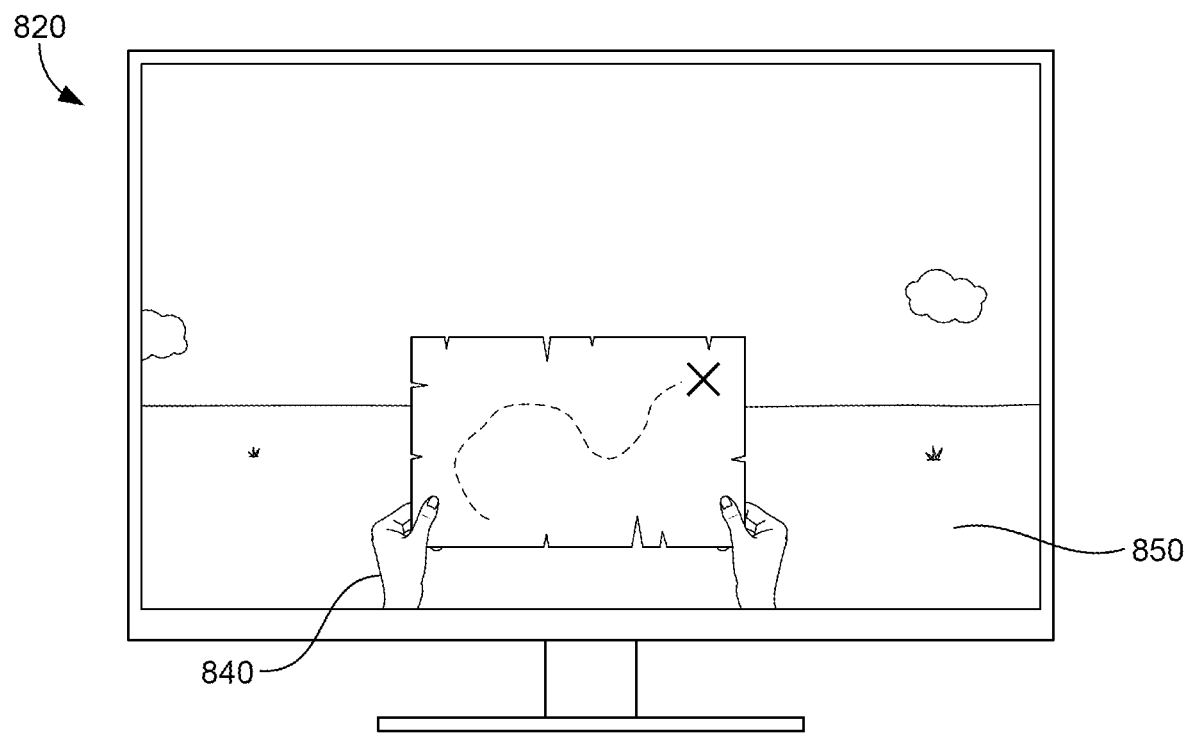

As shown in FIGS. 8A and 8B, the display of a single view point of a sub-environment avatar may take up the entire display screen of their respective user computing device. For example, both a first user and a second user may initiate the generation of a virtual gaming sub-environment 850 by selecting a virtual desktop within the virtual gaming environment. Based on this selection, the virtual gaming sub-environment 850 is populated with at least a first sub-environment virtual avatar 830 and a second sub-environment virtual avatar 840. Both of these avatars exist within this virtual gaming sub-environment 850 and may interact with one another. As mentioned throughout, this virtual gaming sub-environment may take any number of forms, such as a fighting game, racing game, or first-person shooter by way of example. As such, the first sub-environment virtual avatar 830 and the second sub-environment virtual avatar 840 may be a first and a second fighting game character or a first and second car in a racing game. Each of a display of a first user computing device 810 and a display of a second user computing device 820 may display the perspective of their corresponding virtual avatar within the virtual gaming sub-environment 850. Additionally, the virtual gaming sub-environment 850 does not need to be populated with an avatar associated with the first user computer and an avatar associated with the second user computer. For example, in a real-time strategy game, there is not necessarily one avatar associated with the user. Instead the user may select many gaming assets through the user of a mouse and keyboard. As such, both the first user and the second user can interact with the virtual gaming sub-environment and with each other within the virtual gaming sub-environment with, or without avatars. Similar to the gaming sub-environment discussed in FIGS. 7A and 7B, this virtual gaming sub-environment may be hosted on a server which facilitates communication between a first user computing device and a second user computing device.

Figure 9:
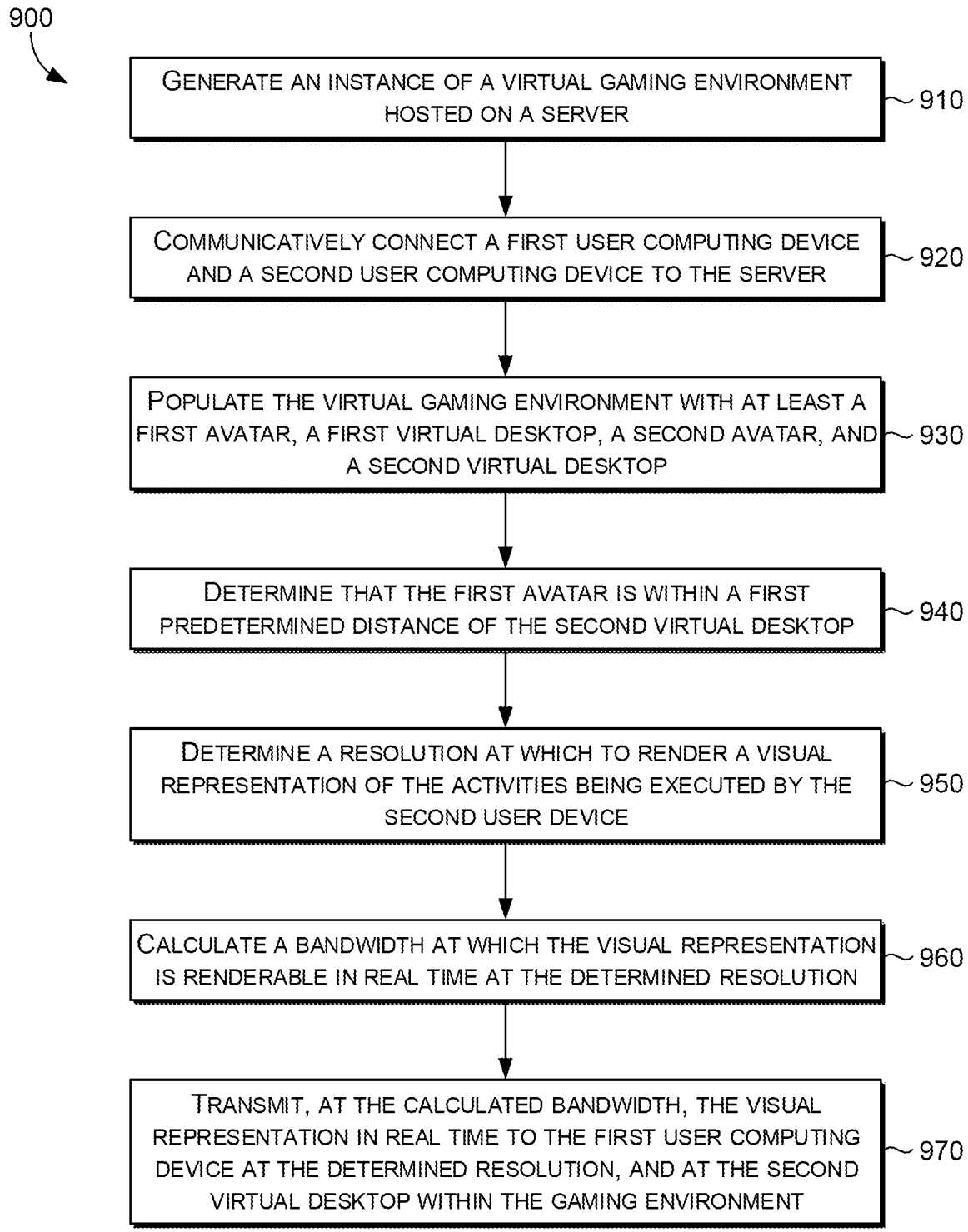
FIG. 9 depicts an example method for generating a virtual gaming environment, in accordance with some embodiments of the present disclosure.
Figure 10:
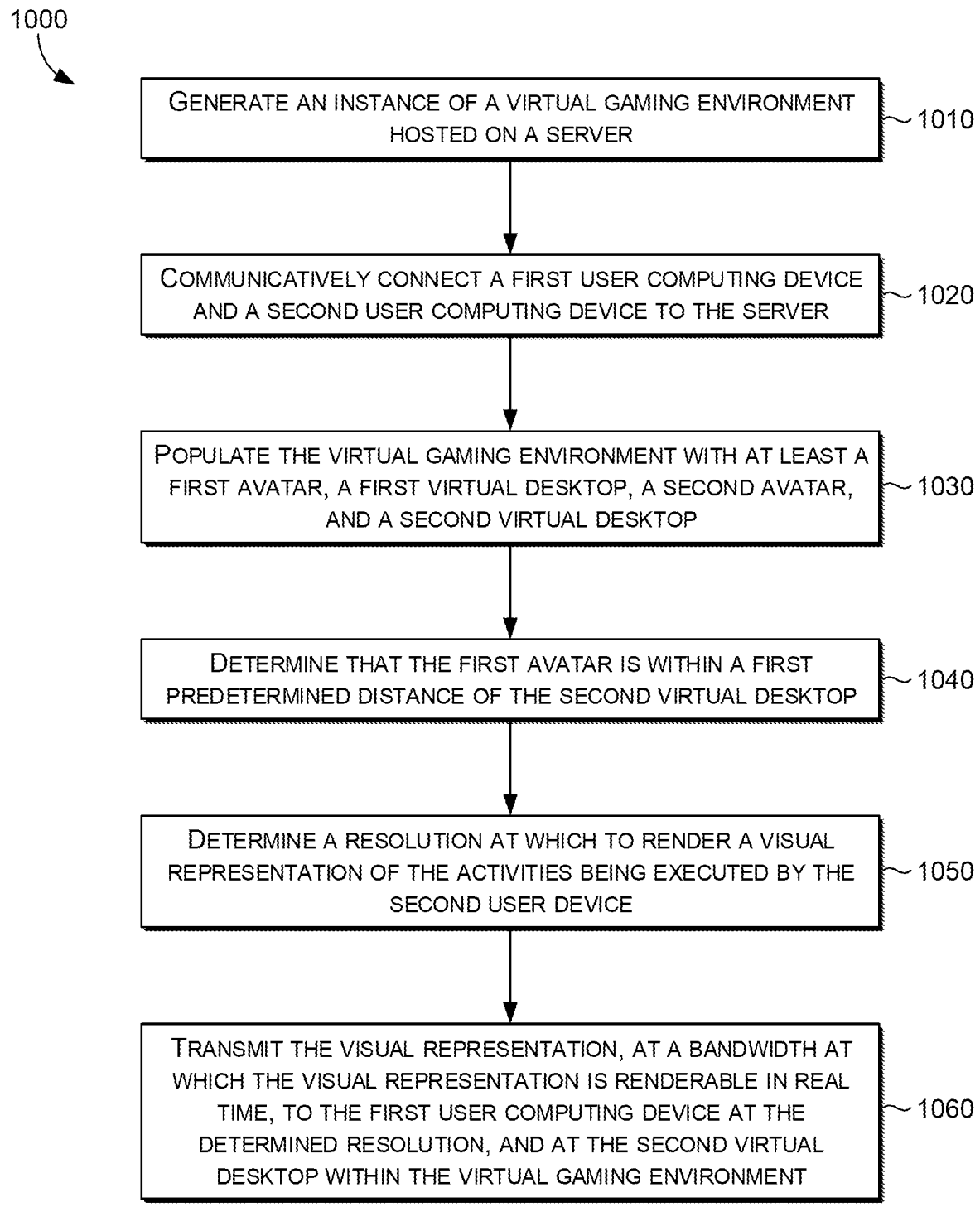
FIG. 10 depicts another example method for generating a virtual gaming environment, in accordance with some embodiments of the present disclosure.
Figure 11:
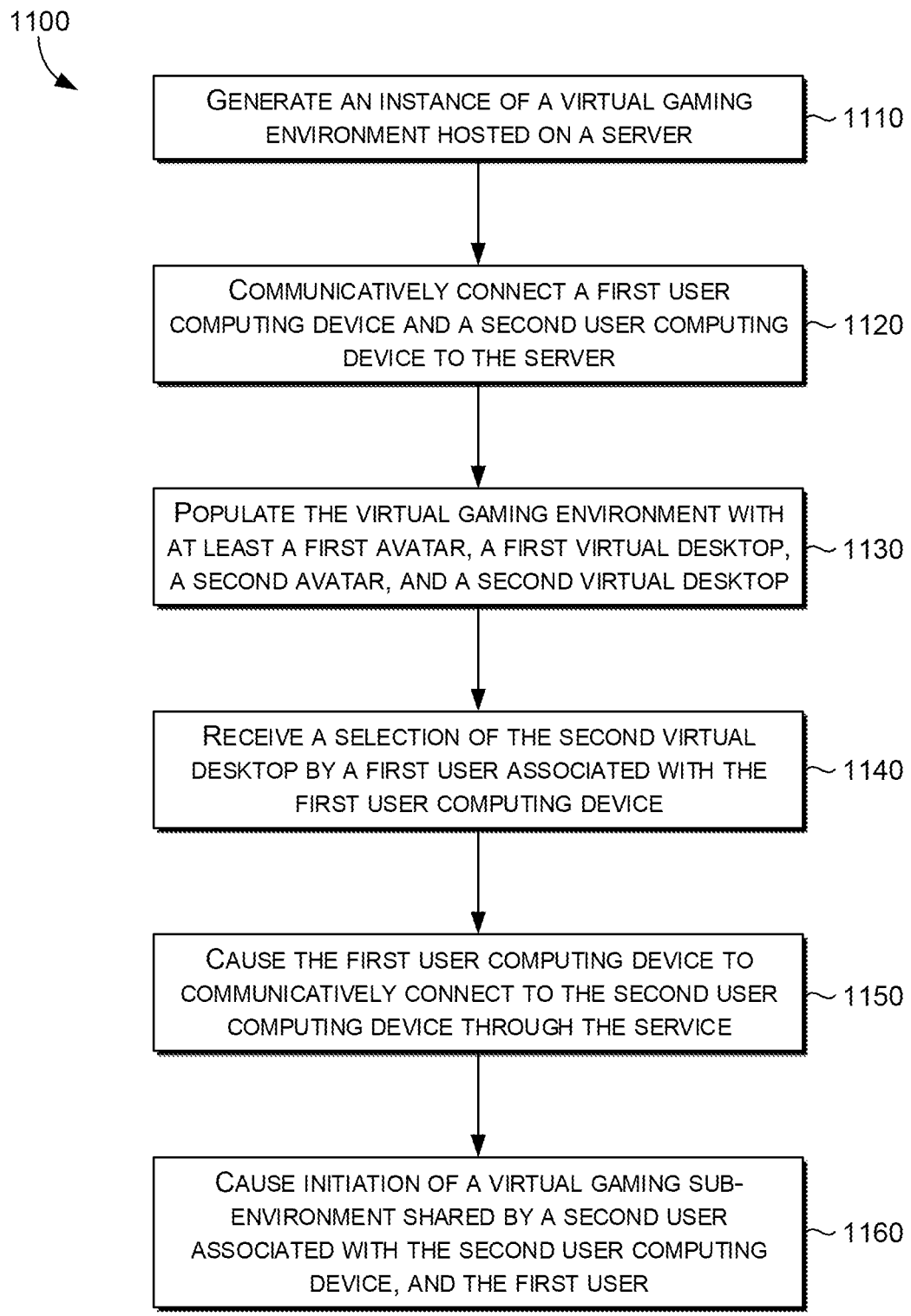
FIG. 11 depicts another example method for generating a virtual gaming environment, in accordance with some embodiments of the present disclosure.

Now, referring to FIGS. 9, 10, and 11, each block of methods 900, 1000, and 1100 can be executed by a computing process that can be performed using any combination of hardware, firmware, software, non-transitory computer storage medium storing computer-usable instructions, or any combination thereof. For instance, various functions can be carried out by a processor executing instructions stored in memory. In some aspects, methods 900, 1000, and 1100 can be embodied as computer-usable instructions stored on computer storage media or as computer-implemented instructions that, when used by at least one computing device, cause the at least one computing device to perform operations. The methods 900, 1000, and 1100 can be provided by a standalone application, a service or hosted service (standalone or in combination with another hosted service), or a plug-in to another product, to name a few. These methods may also be executed by any one system, or any combination of systems, including, but not limited to, those described herein.

Generally, methods 900, 1000, and 1100 facilitate the generation of a virtual gaming environment, in accordance with some aspects of the present disclosure. Some aspects of method 900 begin at block 910. At block 910, an instance of a virtual gaming environment is generated and hosted on a server. At block 920 a first user computing device and a second user computing device are communicatively connected to the server.

At block 930 responsive to communicatively connecting the first user computing device and the second user computing device to the server, the virtual gaming environment is populated with at least a first virtual avatar associated with the first user computing device, a virtual desktop associated with the first user computing device and linked to activities being executed by the first user computing device, a second virtual avatar associated with the second user computing device, and a second virtual desktop associated with the second user computing device and linked to activities being executed by the second user computing device. In further embodiments, a third user computing device may also be communicatively connected to the server. Additionally, the virtual gaming environment may be populated with a third avatar associated with the third user computing device, and a third virtual desktop associated with the third user computing device.

At block 940, it is determined that the first virtual avatar is within a first predetermined distance of the second virtual desktop, within the virtual gaming environment. At block 950, a resolution at which to render a visual representation of the activities being executed by the second user computing device based on the distance of the first virtual avatar to the second virtual desktop is determined. At block 960, a bandwidth at which the visual representation of the activities being executed by the second user computing device is renderable in real time at the determined resolution. At block 970, responsive to calculating the bandwidth, transmitting, at the calculated bandwidth, the visual representation in real time to the first user computing device at the determined resolution, and at the second virtual desktop within the virtual gaming environment. In further embodiments, the virtual gaming environment may be caused to display on the first user computing device. In even further embodiments, the virtual gaming environment may be caused to display on the second user computing device.

In further embodiments, it may be determined that the first virtual avatar is within a second predetermined distance of the second virtual desktop within the virtual gaming environment, wherein the second predetermined distance is closer to the second virtual desktop than the first predetermined distance. A peer-to-peer connection is established between the first user computing device and the second user computing device, and responsive to establishing the peer-to-peer connection, the visual representation is rendered at the second virtual desktop within the gaming environment based on the peer-to-peer connection. In further embodiments, it may be determined that the first virtual avatar is within second predetermined distance to the second virtual desktop, within the virtual gaming environment, wherein the second predetermined distance is farther from the second virtual desktop than the first predetermined distance. A digital image is rendered at the second virtual desktop within the virtual gaming environment.

Turning to FIG. 10, some aspects of method 1000 begin at block 1010. At block 1010, an instance of a virtual gaming environment is generated and hosted on a server. At block 1020, a first user computing device and a second user computing device are communicatively connected to the server. At block 1030, responsive to communicatively connecting the first user computing device and the second user computing device to the server, the virtual gaming environment is populated with at least a first virtual avatar associated with the first user, a first virtual desktop associated with the first user and linked to activities being executed by the first user's computing device, a second virtual avatar associated with a second user, and a second virtual desktop associated with the second user and linked to activities being executed by the second user's computing device. In further embodiments, a third user computing device may also be communicatively connected to the server. Additionally, the virtual gaming environment may be populated with a third avatar associated with the third user computing device, and a third virtual desktop associated with the third user computing device.

At block 1040, it is determined that the first virtual avatar is within a predetermined distance of the second virtual desktop, within the virtual gaming environment. At block 1050, a resolution at which to render a visual representation of the activities being executed by the second user computing device is determined based on the distance of the first virtual avatar to the second virtual desktop. At block 1060, responsive to determining the resolution, the visual representation is transmitted, at a bandwidth at which the visual representation is renderable in real time, to the first user computing device at the determined resolution, and at the second virtual desktop within the virtual gaming environment. In further embodiments, the virtual gaming environment is caused to be displayed on the first user computing device, wherein the second virtual avatar, the second virtual desktop, and the first virtual desktop are displayed. In additional embodiments, the virtual gaming environment is caused to be displayed on the second user computing device, wherein the first virtual avatar, the first virtual desktop, and the second virtual desktop are displayed. In further embodiments, a selection of a termination icon by the first user may be received. Based on receiving this selection, the first user computing device may be disconnected from the server.

Turning to FIG. 11, some aspects of method 1100 begin at block 1110. At block 1110, an instance of a virtual gaming environment is generated and hosted on a server. At block 1120, a first user computing device and a second user computing device are communicatively connected to the server. At block 1130, responsive to communicatively connecting the first user computing device and the second user computing device to the server, the virtual gaming environment is populated with at least a first virtual avatar associated with the first user computing device, a virtual desktop associated with the first user computing device and linked to activities being executed by the first user computing device, a second virtual avatar associated with a second user computing device, and a second virtual desktop associated with the second user computing device and linked to activities being executed by the second user computing device. In further embodiments, a third user computing device may also be communicatively connected to the server. Additionally, the virtual gaming environment may be populated with a third avatar associated with the third user computing device, and a third virtual desktop associated with the third user computing device.

At block 1140, a selection of the second virtual desktop by a first user associated with the first user computing device is received. At block 1150, responsive to the selection, the first user computing device is caused to communicatively connect to the second user computing device through the server. At block 1160, initiation of a virtual gaming sub-environment shared by a second user associated with the second user computing device, and the first user is caused. In additional embodiments, the virtual gaming environment is also populated with a third virtual desktop. In further embodiments, the virtual gaming sub-environment is terminated, and a selection of the third virtual desktop by bot the first user and the second user is received. Based on receiving these selections, the initiation of a second virtual gaming sub-environment shared by the second user and the first user and hosted on the server is caused. Additionally, the virtual gaming sub-environment may be caused to display on the second user computing device. The virtual gaming sub-environment may also be caused to display on the first user computing device.

Figure 12:
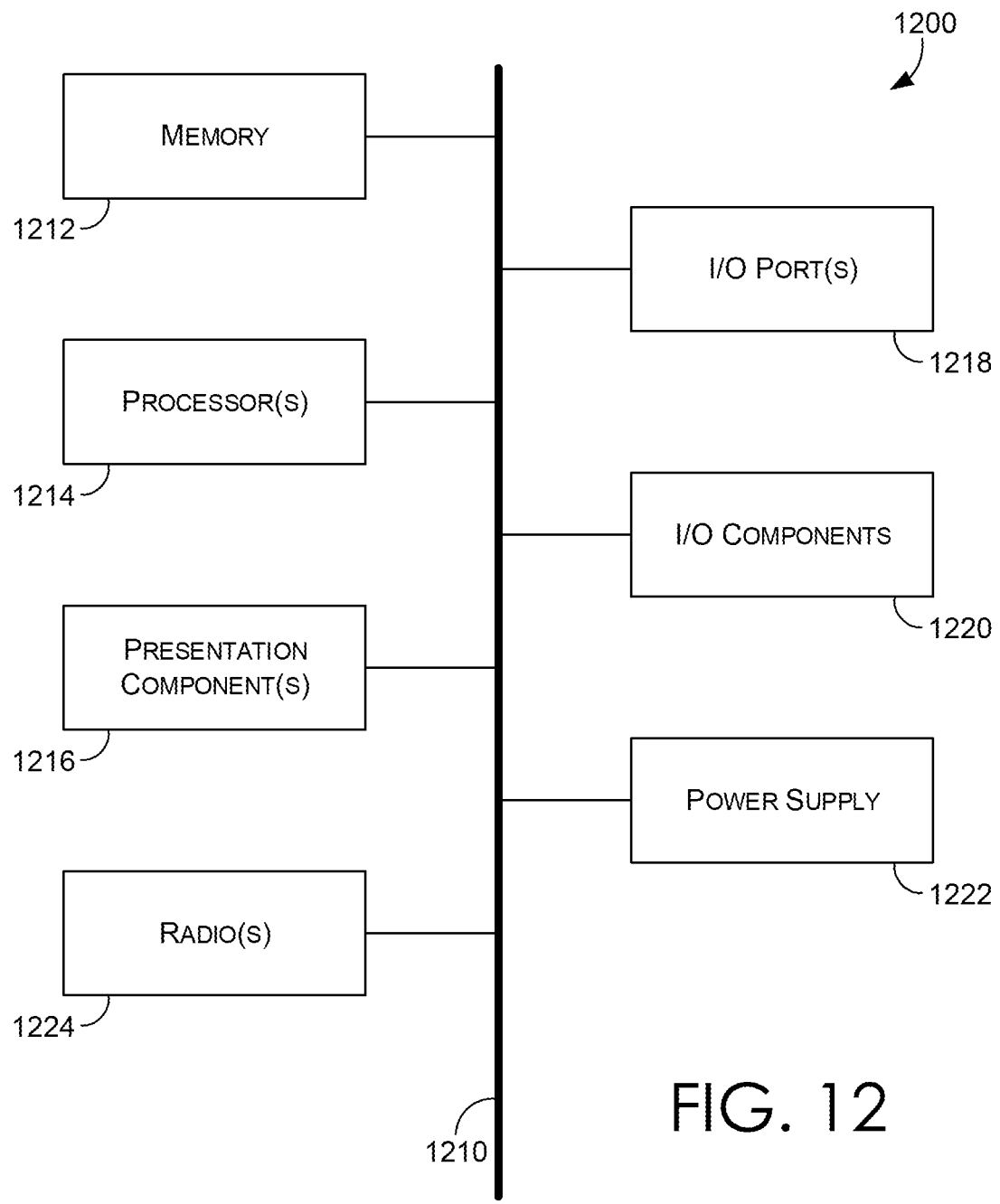
FIG. 12 depicts an example computing device, in accordance with aspects hereof.

Having described aspects of the present disclosure, an example operating environment in which embodiments of the present disclosure can be implemented is described below in order to provide a general context for various aspects of the present disclosure. Referring initially to FIG. 12 in particular, an example operating environment for implementing embodiments of the present disclosure is shown and designated generally as computing device 1200. Computing device 1200 is but one example of a suitable computing environment and is not intended to suggest any limitation as to the scope of use or functionality of the disclosed embodiments. Neither should the computing device 1200 be interpreted as having any dependency or requirement relating to any one or combination of components illustrated.

The embodiments herein can be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The described embodiments can be practiced in a variety of system configurations, including hand-held devices, consumer electronics, general-purpose computers, more specialty computing devices, etc. The described embodiments can also be practiced in distributed computing environments where tasks are performed by remote-processing devices that are linked through a communications network.

With reference to FIG. 12, computing device 1200 includes a bus 1210 that directly or indirectly couples the following devices: memory 1212, one or more processors 1214, one or more presentation components 1216, input/output (I/O) ports 1218, input/output (I/O) components 1220, and an illustrative power supply 1222. In some example embodiments, the computing device 1200 can be or can comprise a mobile electronic device such as a smart phone, tablet, touchscreen laptop, or the like. Bus 1210 represents what can be one or more busses (such as an address bus, data bus, or combination thereof). Although the various blocks of FIG. 12 are shown with lines for the sake of clarity, in reality, delineating various components is not so clear, and metaphorically, the lines would more accurately be grey and fuzzy. For example, one can consider a presentation component such as a display device to be an I/O component. Also, processors have memory. The inventor recognizes that such is the nature of the art, and reiterates that the diagram of FIG. 12 is merely illustrative of an example computing device that can be used in connection with one or more embodiments of the present disclosure. Distinction is not made between such categories as "workstation," "server," "laptop," "hand-held device," etc., as all are contemplated within the scope of FIG. 12 and reference to "computing device."

Computing device 1200 typically includes a variety of computer-readable media. Computer-readable media can be any available media that can be accessed by computing device 1200 and includes both volatile and nonvolatile media, and removable and non-removable media. By way of example, and not limitation, computer-readable media can comprise computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 1200. Computer storage media does not comprise signals per se. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 1212 includes computer-storage media in the form of volatile and/or nonvolatile memory. The memory can be removable, non-removable, or a combination thereof. Example hardware devices include solid-state memory, hard drives, optical-disc drives, etc. Computing device 1200 includes one or more processors that read data from various entities such as memory 1212 or I/O components 1220. Presentation component(s) 1216 present data indications to a user or other device. Example presentation components include a display device, speaker, printing component, vibrating component, etc.

I/O ports 1218 allow computing device 1200 to be logically coupled to other devices including I/O components 1220, some of which can be built in. Illustrative components include a microphone, joystick, game pad, satellite dish, scanner, printer, wireless device, etc. The I/O components 1220 can provide a natural user interface (NUI) that processes air gestures, voice, or other physiological inputs generated by a user. In some instances, inputs can be transmitted to an appropriate network element for further processing. An NUI can implement any combination of speech recognition, stylus recognition, facial recognition, biometric recognition, gesture recognition both on screen and adjacent to the screen, air gestures, head and eye tracking, and touch recognition (as described in more detail below) associated with a display of the computing device 1200. The computing device 1200 can be equipped with depth cameras, such as stereoscopic camera systems, infrared camera systems, RGB camera systems, touchscreen technology, and combinations of these, for gesture detection and recognition. Additionally, the computing device 1200 can be equipped with accelerometers or gyroscopes that enable detection of motion. The output of the accelerometers or gyroscopes can be provided to the display of the computing device 1200 to render immersive augmented reality or virtual reality.

Some embodiments of computing device 1200 may include one or more radio(s) 1224 (or similar wireless communication components). The radio 1224 transmits and receives radio or wireless communications. The computing device 1200 may be a wireless terminal adapted to receive communications and media over various wireless networks. Computing device 1200 may communicate via wireless protocols, such as long term evolution ("LTE"), code division multiple access ("CDMA"), global system for mobiles ("GSM"), or time division multiple access ("TDMA"), as well as others, to communicate with other devices. The radio communications may be a short-range connection, a long-range connection, or a combination of both a short-range and a long-range wireless telecommunications connection. When we refer to "short" and "long" types of connections, we do not mean to refer to the spatial relation between two devices. Instead, we are generally referring to short range and long range as different categories, or types, of connections (i.e., a primary connection and a secondary connection). A short-range connection may include, by way of example and not limitation, a Wi-Fi® connection to a device (e.g., mobile hotspot) that provides access to a wireless communications network, such as a WLAN connection using the 802.11 protocol; a Bluetooth® connection to another computing device is a second example of a short-range connection, or a near-field communication connection. A long-range connection may include a connection using, by way of example and not limitation, one or more of CDMA, LTE, GPRS, GSM, TDMA, and 802.16 protocols.

As can be understood, embodiments of the present disclosure provide for, among other things, systems and methods for generating a virtual gaming environment. The present disclosure has been described in relation to particular embodiments, which are intended in all respects to be illustrative rather than restrictive. Alternative embodiments will become apparent to those of ordinary skill in the art to which the present disclosure pertains without departing from its scope. Further, it is contemplated that some of the aspects described herein can be implemented in a cross-platform (e.g., traditional gaming systems, mobile devices, and consoles in any combination) MOBA, MMORPG, RTS game, or any other genre of game. Said another way, the generation of the virtual gaming environment described herein can improve the collaboration of a video games played across multiple gaming platforms in the same shared gaming environment.

From the foregoing, it will be seen that embodiments of the present disclosure are one well adapted to attain all the ends and objects set forth above, together with other advantages which are obvious and inherent to the system and method. It will be understood that certain features and subcombinations are of utility and can be employed without reference to other features and subcombinations. This is contemplated by and is within the scope of the claims.

The subject matter of the present disclosure is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" can be used herein to connote different elements of methods employed, the terms should not be interpreted as implying any particular order among or between various steps herein disclosed unless and except when the order of individual steps is explicitly described.

We claim:

1. A computer-implemented method for generating a virtual gaming environment, the computer-implemented method comprising:
generating an instance of a virtual gaming environment hosted on a server;
communicating data to populate a virtual gaming environment within a graphical user interface of a first user computing device;
communicatively connecting the first user computing device and a second user computing device to the server;
responsive to communicatively connecting the first user computing device and the second user computing device to the server, populating the virtual gaming environment with a plurality of virtual objects, the virtual objects including at least a first virtual avatar associated with a first user, a first virtual desktop representative of the first user and depicting representations of activities being executed by the first user's computing device, a second virtual avatar associated with a second user, and a second virtual desktop representative of the second user and depicting a program executed by the second user computing device;
determining that the first virtual avatar is within a predetermined distance of the second virtual desktop, within the virtual gaming environment;
determining a resolution at which to render a visual representation of the program executed by the second user computing device based on the predetermined distance of the first virtual avatar to the second virtual desktop;
responsive to determining the resolution, transmitting the visual representation, at a bandwidth at which the visual representation is renderable in real time, to the first user computing device at the determined resolution, and at the second virtual desktop within the virtual gaming environment;
receiving a selection of the second virtual desktop by the first virtual avatar within the virtual gaming environment; and
responsive to receipt of the selection initiating a virtual gaming sub-environment that connects the first user computing device to the program executed by the second user computing device; and
transmitting an input received by the first user computing device to the program executed by the second user computing device, wherein the input interacts with assets associated with the program executed by the second user computing device.

2. The computer-implemented method of claim 1, further comprising communicatively connecting a third user computing device to the server.

3. The computer-implemented method of claim 2, further comprising populating the virtual gaming environment with a third virtual desktop associated with the third user computing device, and a third avatar associated with the third user computing device.

4. The computer-implemented method of claim 1, further comprising receiving a selection of a termination icon by the first user.

5. The computer-implemented method of claim 4, further comprising disconnecting the first user computing device from the server based on receiving the selection of the termination icon by the first user.

6. The computer-implemented method of claim 1, further comprising causing display of the virtual gaming environment on a display associated with the first user computing device, wherein the second virtual avatar, the second virtual desktop are displayed, and the first virtual desktop are displayed.

7. The computer-implemented method of claim 1, further comprising causing display of the virtual gaming environment on a display associated with the second user computing device, wherein the first virtual avatar, the first virtual desktop, and the second virtual desktop are displayed.

8. A non-transitory computer storage medium storing computer-usable instructions that, when used by at least one computing device, cause the at least one computing device to perform operations comprising:
generating an instance of a virtual gaming environment hosted on a server;
communicating data to populate a virtual gaming environment within a graphical user interface of a first user computing device;
communicatively connecting the first user computing device and a second user computing device to the server;
responsive to communicatively connecting the first user computing device and the second user computing device to the server, populating the virtual gaming environment with a plurality of virtual objects, the virtual objects including at least a first virtual avatar associated with the first user computing device, a first virtual desktop representative of the first user computing device and depicting representations of activities being executed by the first user computing device, a second virtual avatar associated with the second user computing device, and a second virtual desktop representative of the second user computing device and depicting a program executed by the second user computing device;
determining that the first virtual avatar is within a first predetermined distance of the second virtual desktop, within the virtual gaming environment;
determining a resolution at which to render a visual representation of the program executed by the second user computing device based on the first predetermined distance of the first virtual avatar to the second virtual desktop;
calculating a bandwidth at which the visual representation of the program executed by the second user computing device is renderable in real time at the determined resolution;
responsive to calculating the bandwidth, transmitting, at the calculated bandwidth, the visual representation in real time to the first user computing device at the determined resolution, and at the second virtual desktop within the virtual gaming environment;

receiving a selection of the second virtual desktop by the first virtual avatar within the virtual gaming environment; and responsive to receipt of the selection initiating a virtual gaming sub-environment that connects the first user computing device to the program executed by the second user computing device; and transmitting an input received by the first user computing device to the program executed by the second user computing device, wherein the input interacts with assets associated with the program executed by the second user computing device.

9. The non-transitory computer storage medium of claim 8, wherein initiating the virtual gaming sub-environment establishes a peer-to-peer connection between the first user computing device and the second user computing device.

10. The non-transitory computer storage medium of claim 9 wherein the input is transmitted through the peer-to-peer connection.

11. The non-transitory computer storage medium of claim 9 further comprising maintaining the communicative connection of the first user computing device and the second user computing device to the server.

12. The non-transitory computer storage medium of claim 11 wherein a second input interacts with assets within the virtual gaming environment hosted on the server.

13. The non-transitory computer storage medium of claim 8, further comprising causing display of the virtual gaming environment on the second user computing device.

14. The non-transitory computer storage medium of claim 9, further comprising populating the virtual gaming environment with a third avatar associated with the third user computing device, and a third virtual desktop associated with the third user computing device.

15. A system comprising:
one or more processors configure to:
generate an instance of a virtual gaming environment hosted on a server;
communicate data to populate a virtual gaming environment within a graphical user interface of a first user computing device;
communicatively connect the first user computing device and a second user computing device to the server;
responsive to communicatively connecting the first user computing device and the second user computing device to the server, populate the virtual gaming environment with a plurality of virtual objects, the virtual objects including at least a first virtual avatar associated with a first user, a first virtual desktop representative of the first user computing device and depicting representations of activities being executed by the first user computing device, a second virtual avatar associated with a second user, and a second virtual desktop representative of the second user computing device and depicting a program executed by the second user computing device;

determine that the first virtual avatar is within a predetermined distance of the second virtual desktop, within the virtual gaming environment;

determine a resolution at which to render a visual representation of the program executed by the second user computing device based on the predetermined distance of the first virtual avatar to the second virtual desktop;

responsive to determining the resolution, transmit the visual representation, at a bandwidth at which the visual representation is renderable in real time, to the first user computing device at the determined resolution, and at the second virtual desktop within the virtual gaming environment;

receive a selection of the second virtual desktop by the first virtual avatar within the virtual gaming environment; and responsive to receipt of the selection initiate a virtual gaming sub- environment that connects the first user computing device to the program executed by the second user computing device; and transmit an input received by the first user computing device to the program executed by the second user computing device, wherein the input interacts with assets associated with the program executed by the second user computing device.

16. The system of claim 15 further configured to:
communicatively connect a third user computing device to the server; and
populate the virtual gaming environment with a third avatar associated with the third user computing device and a third virtual desktop associated with the third user computing device.

17. The system of claim 16, further configured to:
terminate the virtual gaming sub-environment;
receive a selection of the third virtual desktop by the first user;
receive a selection of the third virtual desktop by the second user; and
cause initiation of a second virtual gaming sub-environment shared by the second user and the first user and hosted on the server.

18. The system of claim 15, further configured to cause display of the virtual gaming sub-environment on a display associated with the second user computing device.

19. The system of claim 15, further configured to cause display of the virtual gaming sub-environment on a display associated with the first user computing device.

20. The system of claim 15, wherein the system initiates the virtual gaming sub-environment shared by the second user and the first user, and wherein the virtual gaming sub-environment enables the first user's interaction with a set of assets associated with the second user computing device.

* * * * *